United States Patent [19]
Kano et al.

[11] Patent Number: 6,088,773
[45] Date of Patent: *Jul. 11, 2000

[54] CHECKPOINT ACQUISITION ACCELERATING APPARATUS

[75] Inventors: Takuya Kano; Hiroshi Sakai; Hiroo Hayashi, all of Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/917,923

[22] Filed: Aug. 27, 1997

[30] Foreign Application Priority Data

Sep. 4, 1996 [JP] Japan .................... 8-234321

[51] Int. Cl.⁷ .................................. G06F 12/16
[52] U.S. Cl. ...................... 711/161; 711/146; 714/19
[58] Field of Search ...................... 711/118, 135, 711/141, 143, 161, 162; 714/1, 2, 15, 19

[56] References Cited

U.S. PATENT DOCUMENTS

| 4,740,969 | 4/1988 | Fremont | 714/15 |
| 5,745,730 | 4/1998 | Nozue et al. | 711/135 |

FOREIGN PATENT DOCUMENTS

| 348 652 A2 | 1/1990 | European Pat. Off. . |
| 645 708 A1 | 3/1995 | European Pat. Off. . |
| 750 258 A2 | 12/1996 | European Pat. Off. . |

OTHER PUBLICATIONS

Relevant portion of Office Action of Application No. 97 115 030.5 dated Jun. 4, 1999.

*Primary Examiner*—Eddie P. Chan
*Assistant Examiner*—Kevin L. Ellis
*Attorney, Agent, or Firm*—Finnegan, Henderson, Farabow, Garrett & Dunner, L.L.P.

[57] ABSTRACT

A novel checkpoint acquisition accelerating apparatus is disclosed. When data are updated on a cache memory, a before-image acquiring section acquires the update address and the previous data and stores them in a before-image storing section. A cache flush executing section issues to a system bus a bus command requesting the contents of the updated cache block to be written-back to a main memory using all the addresses stored in the before-image storing section. A main memory restoring section, on the other hand, issues bus command requesting all the previous data stored in the before-image storing section to be updated and written in the main memory on last-in first-out basis. As a result, a checkpoint acquisition accelerating apparatus is realized which is capable of easily realizing the checkpoint and recovery function in a computer including at least a standard uniprocessor.

42 Claims, 24 Drawing Sheets

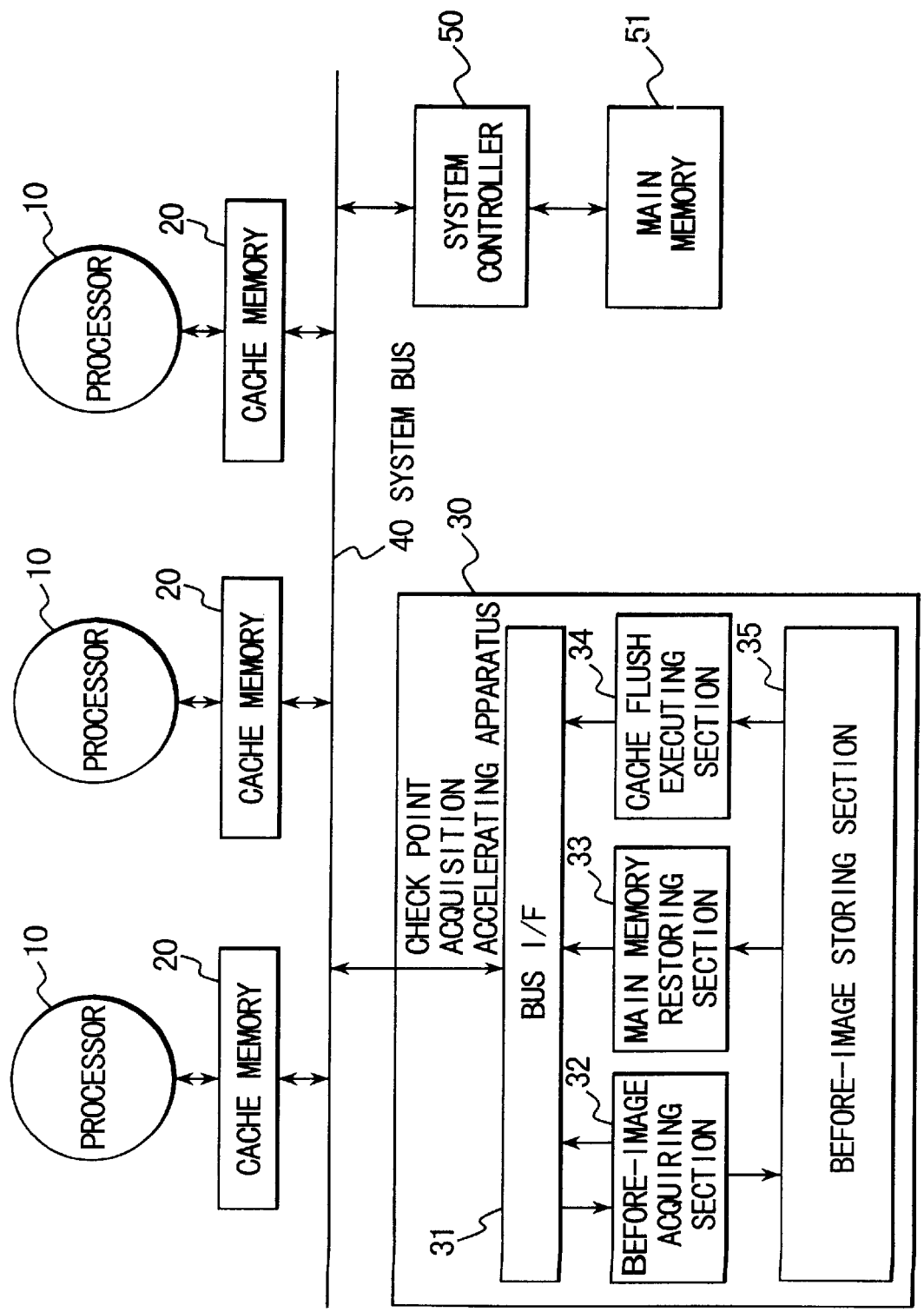
F I G. 2

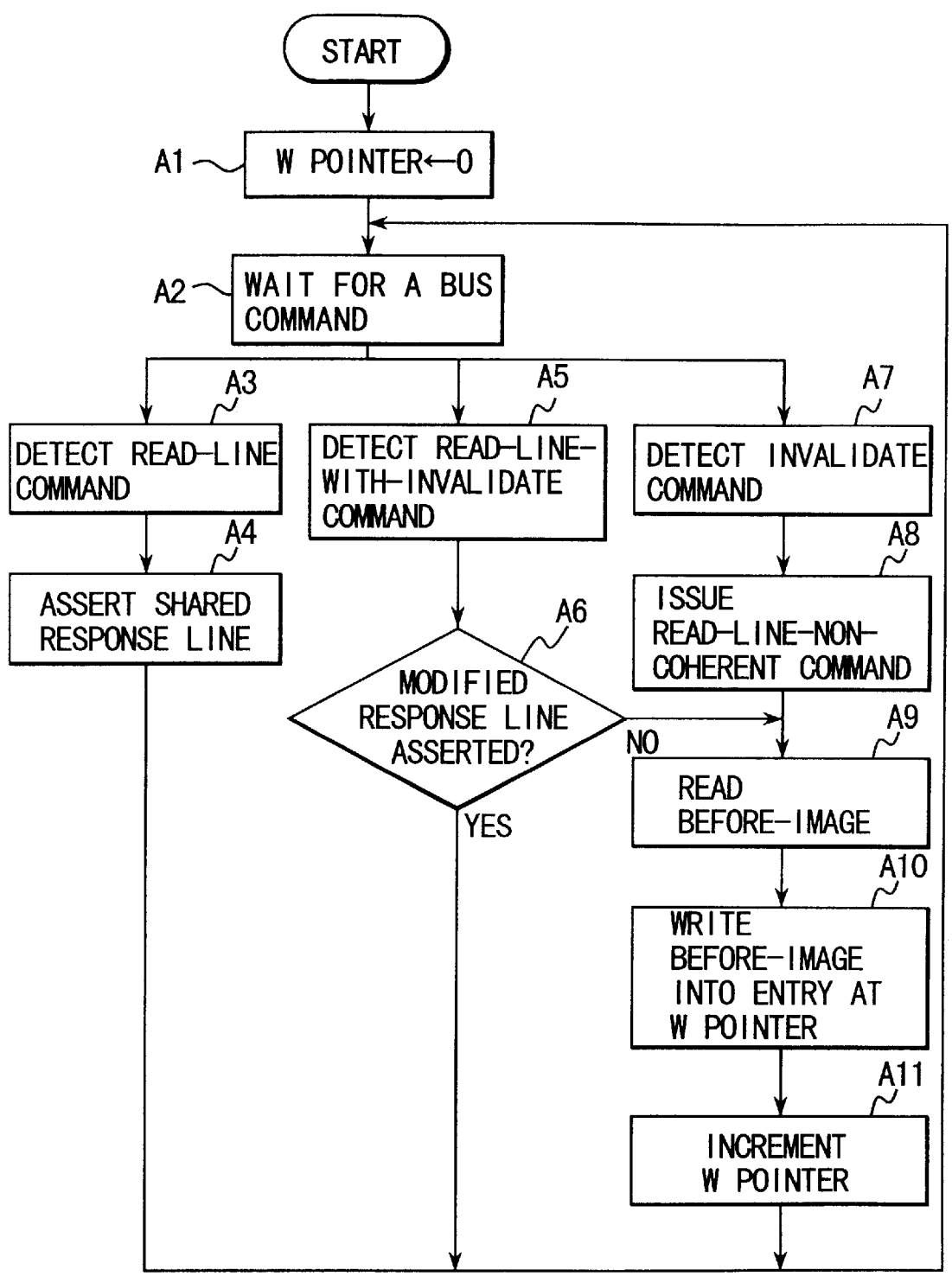
F I G. 4

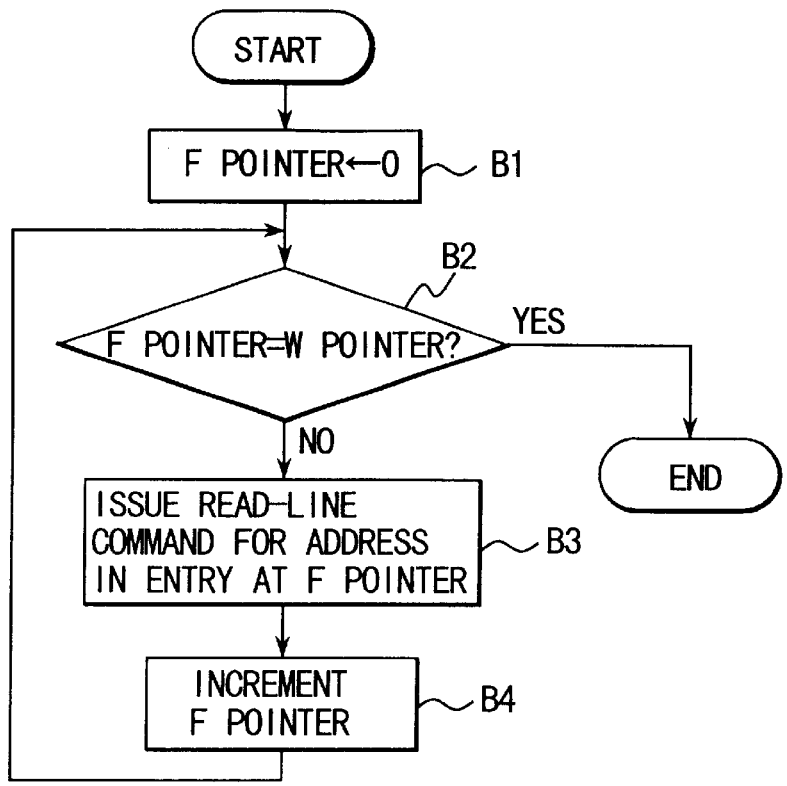
F I G. 5
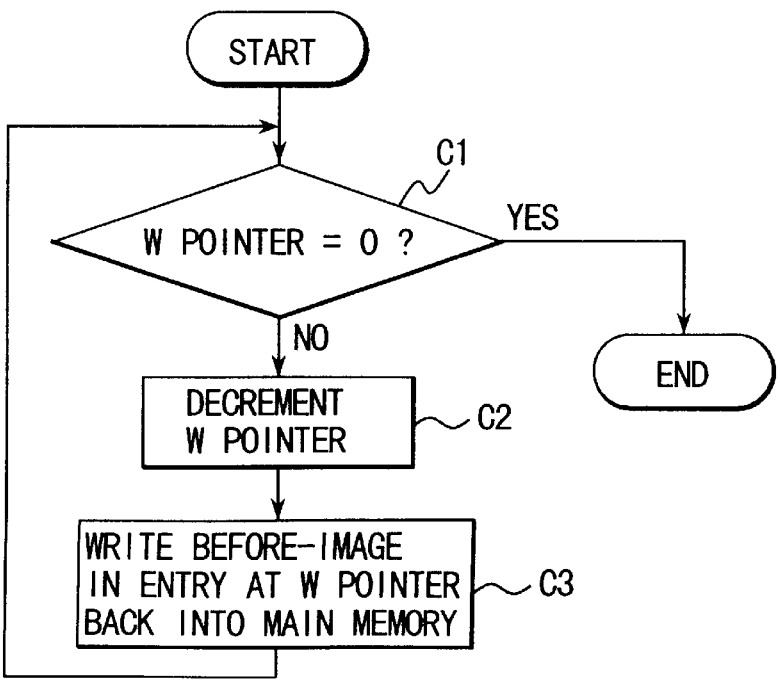
F I G. 6

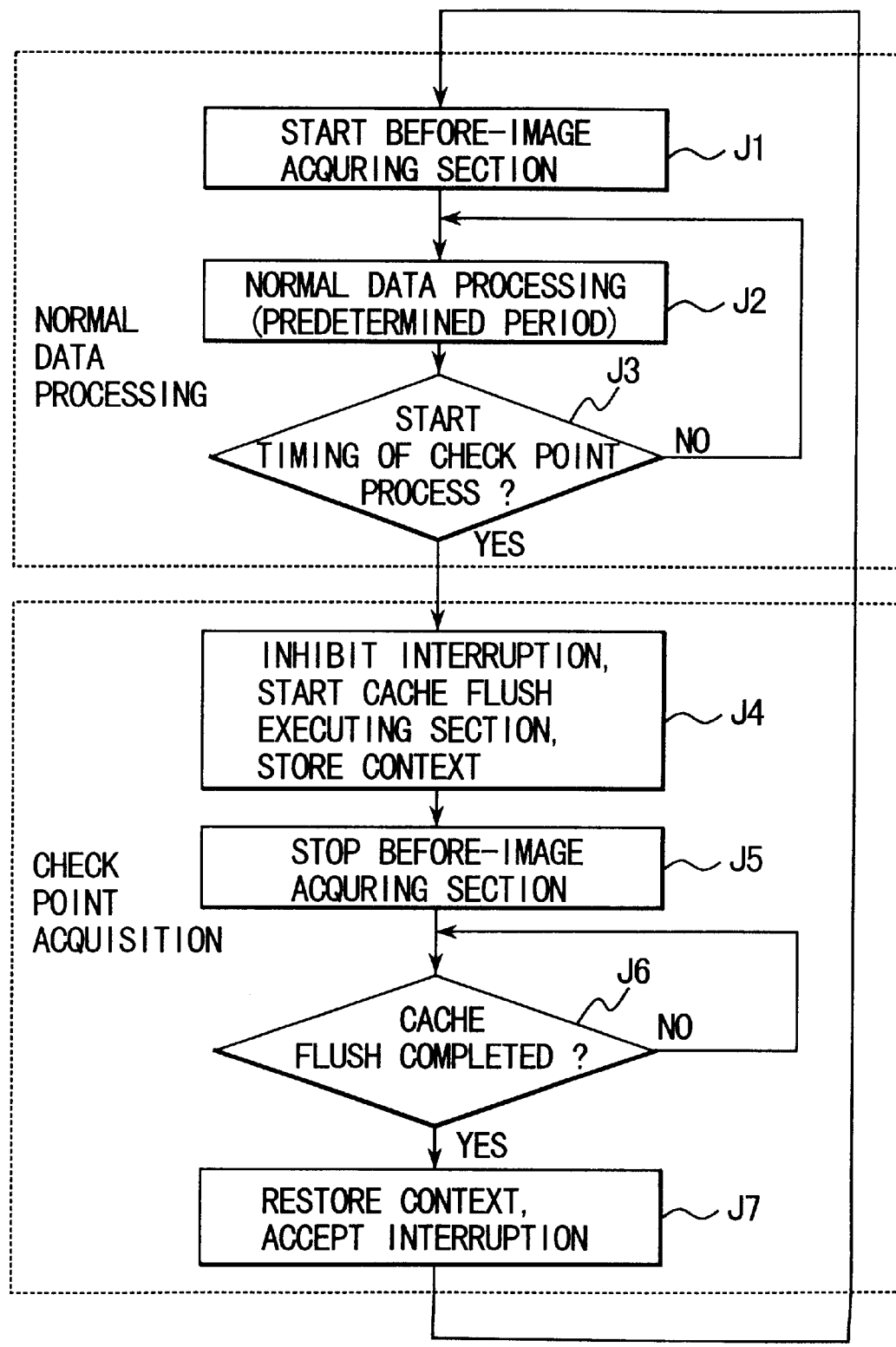
F I G. 7

| | PROCESSOR | CACHE BLOCK BLK0 | SYSTEM BUS | MAIN MEMORY | BEFORE-IMAGE |
|---|---|---|---|---|---|
| 1 | | CLEAN-SHARED a:A0 | | a:A0 b:B0 | NONE |
| 2 | UPDATE ADDRESS a | CLEAN-SHARED a:A1 | INVALIDATE(a) | a:A0 b:B0 | NONE |
| 3 | | MODIFIED a:A1 | RESPONSE:ACK | a:A0 b:B0 | NONE |
| 4 | | MODIFIED a:A1 | READ-LINE-NON-COHERENT(a) | a:A0 b:B0 | NONE |
| 5 | | MODIFIED a:A1 | RESPONSE:A0 FROM MAIN MEMORY | a:A0 b:B0 | a:A0 |
| 6 | UPDATE ADDRESS b | MODIFIED a:A1 | READ-LINE-WITH-INVALIDATE(b) | a:A0 b:B0 | a:A0 |
| 7 | | MODIFIED b:B1 | RESPONSE:B0 FROM MAIN MEMORY | a:A0 b:B0 | a:A0 b:B0 |
| 8 | | MODIFIED b:B1 | WRITE-LINE (a:A1) | a:A0 b:B0 | a:A0 b:B0 |
| 9 | | MODIFIED b:B1 | RESPONSE:ACK | a:A1 b:B0 | a:A0 b:B0 |
| 10 | UPDATE ADDRESS a | MODIFIED b:B1 | READ-LINE-WITH-INVALIDATE(a) | a:A1 b:B0 | a:A0 b:B0 |
| 11 | | MODIFIED a:A2 | RESPONSE:A1 FROM MAIN MEMORY | a:A1 b:B0 | a:A0 b:B0 a:A1 |
| 12 | | MODIFIED a:A2 | WRITE-LINE (b:B1) | a:A1 b:B0 | a:A0 b:B0 a:A1 |
| 13 | | MODIFIED a:A2 | RESPONSE:ACK | a:A1 b:B1 | a:A0 b:B0 a:A1 |

FIG. 8

| | PROCESSOR | CACHE BLOCK BLK0 | SYSTEM BUS | MAIN MEMORY | BEFORE-IMAGE |
|---|---|---|---|---|---|
| 1 | | MODIFIED a:A2 | | a:A1 b:B1 | a:A0 b:B0 a:A1 |
| 2 | | MODIFIED a:A2 | READ-LINE(a) | a:A1 b:B1 | a:A0 b:B0 a:A1 |
| 3 | | CLEAN-SHARED a:A2 | RESPONSE:A2 FROM CACHE MEMORY | a:A2 b:B1 | a:A0 b:B0 a:A1 |
| 4 | | CLEAN-SHARED a:A2 | READ-LINE(b) | a:A2 b:B1 | a:A0 b:B0 a:A1 |
| 5 | | CLEAN-SHARED a:A2 | RESPONSE:B1 FROM MAIN MEMORY | a:A2 b:B1 | a:A0 b:B0 a:A1 |
| 6 | | CLEAN-SHARED a:A2 | READ-LINE(a) | a:A2 b:B1 | a:A0 b:B0 a:A1 |
| 7 | | CLEAN-SHARED a:A2 | RESPONSE:A2 FROM MAIN MEMORY | a:A2 b:B1 | a:A0 b:B0 a:A1 |

FIG. 9

| | PROCESSOR | CACHE BLOCK BLK0 | SYSTEM BUS | MAIN MEMORY | BEFORE-IMAGE |
|---|---|---|---|---|---|
| 1 | | MODIFIED a:A2 | | a:A1 b:B1 | a:A0 b:B0 a:A1 |
| 2 | (PROCESSOR INVALIDATES ALL THE CACHE BLOCKS) | | | | |
| 3 | | INVALID | | a:A1 b:B1 | a:A0 b:B0 a:A1 |
| 4 | | INVALID | WRITE-LINE (a:A1) | a:A1 b:B1 | a:A0 b:B0 |
| 5 | | INVALID | RESPONSE:ACK | a:A1 b:B1 | a:A0 b:B0 |
| 6 | | INVALID | WRITE-LINE (b:B0) | a:A1 b:B1 | a:A0 |
| 7 | | INVALID | RESPONSE:ACK | a:A1 b:B0 | a:A0 |
| 8 | | INVALID | WRITE-LINE (a:A0) | a:A1 b:B0 | NONE |
| 9 | | INVALID | RESPONSE:ACK | a:A0 b:B0 | NONE |

F I G. 10

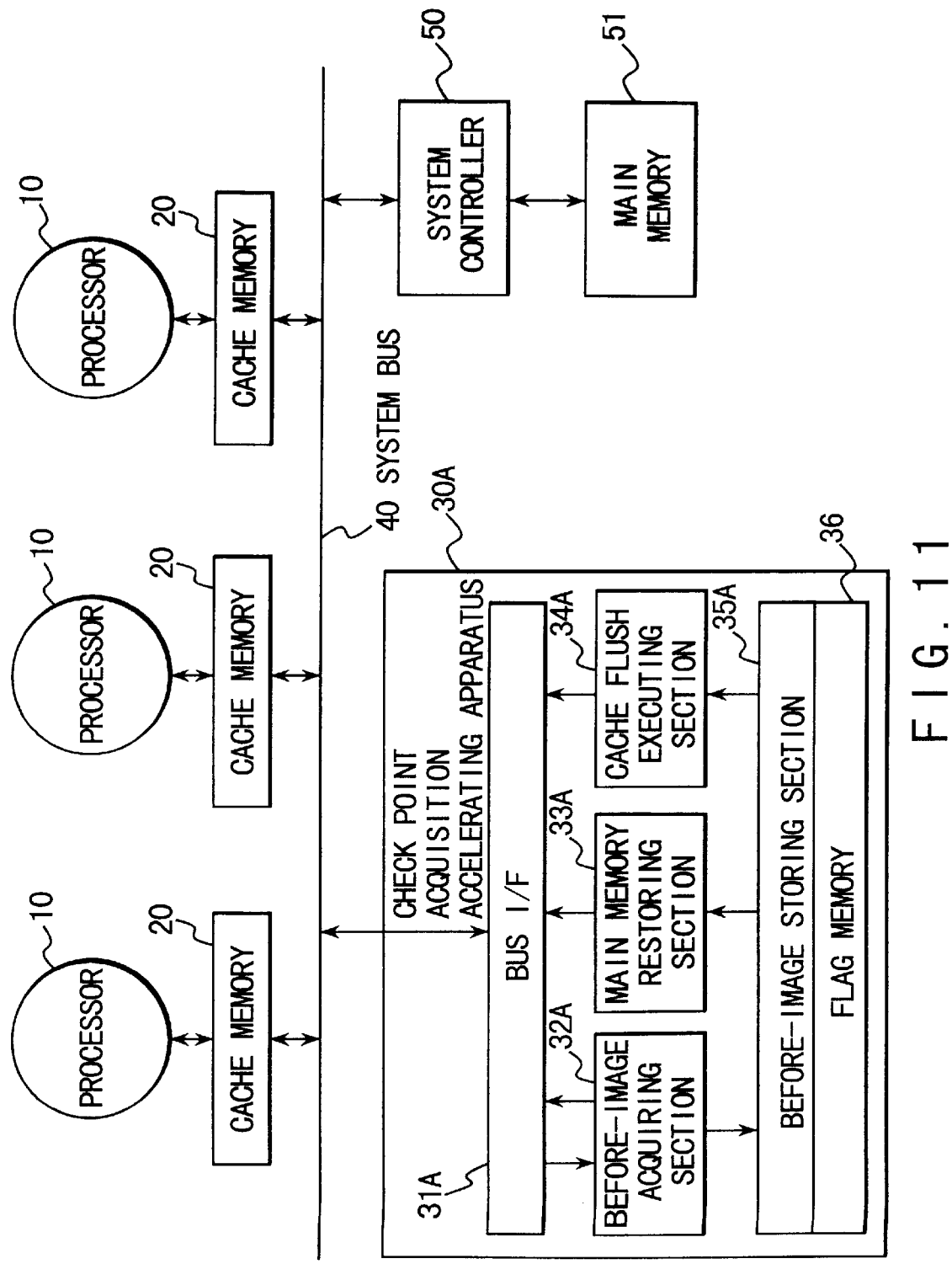
F I G. 11

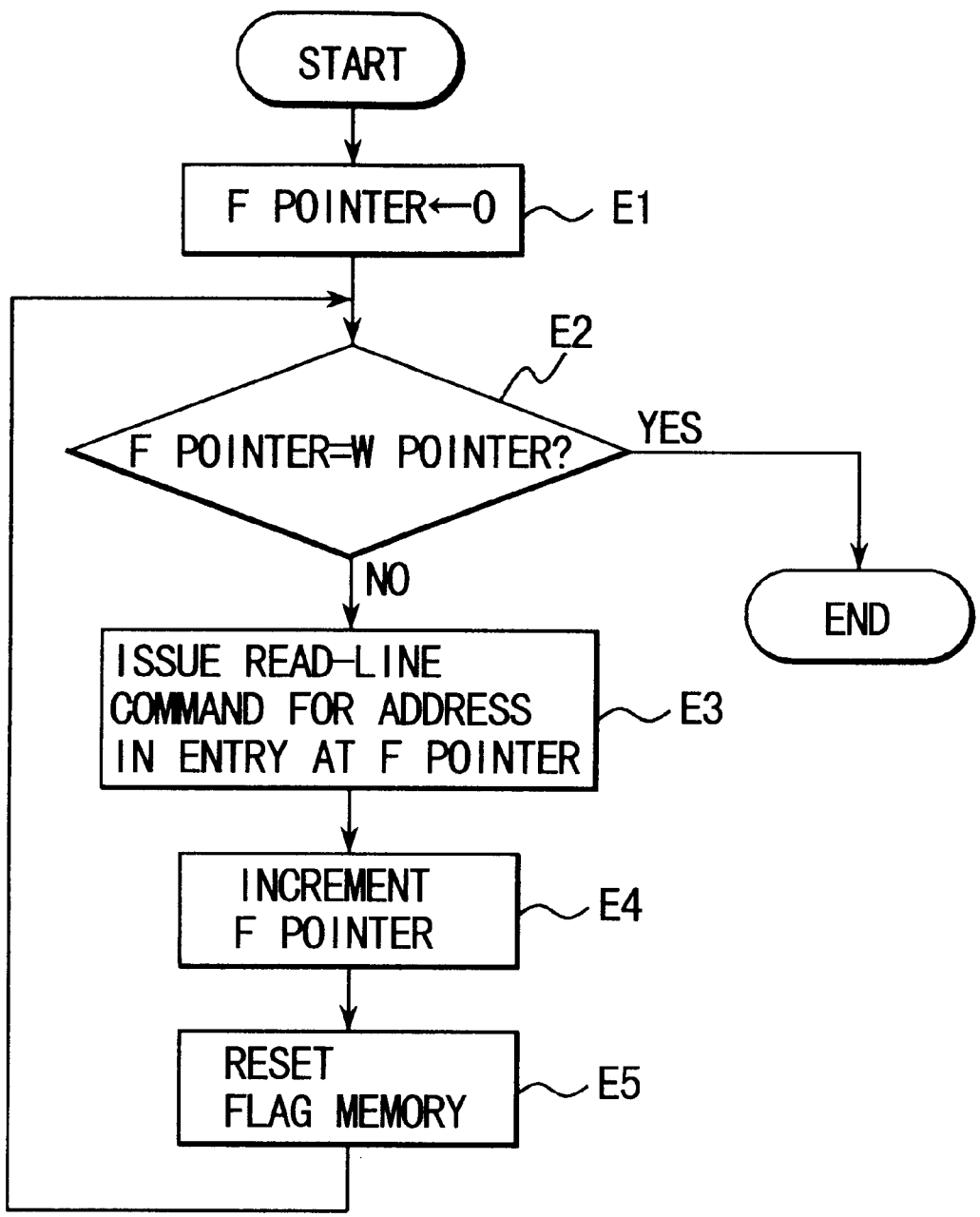
F I G. 13

| | PROCESSOR | CACHE BLOCK BLK0 | SYSTEM BUS | MAIN MEMORY | FLAG MEMORY | BEFORE-IMAGE |
|---|---|---|---|---|---|---|
| 1 | | CLEAN-SHARED a:A0 | | a:A0 b:B0 | a:OFF b:OFF | NONE |
| 2 | UPDATE ADDRESS a | CLEAN-SHARED a:A0 | INVALIDATE(a) | a:A0 b:B0 | a:OFF b:OFF | NONE |
| 3 | | MODIFIED a:A1 | RESPONSE:ACK | a:A0 b:B0 | a:ON b:OFF | NONE |
| 4 | | | READ-LINE-NON-COHERENT(a) | a:A0 b:B0 | a:ON b:OFF | NONE |
| 5 | | | RESPONSE:A0 FROM MAIN MEMORY | a:A0 b:B0 | a:ON b:OFF | a:A0 |
| 6 | UPDATE ADDRESS b | MODIFIED a:A1 | READ-LINE-WITH-INVALIDATE(b) | a:A0 b:B0 | a:ON b:OFF | a:A0 |
| 7 | | MODIFIED b:B1 | RESPONSE:B0 FROM MAIN MEMORY | a:A0 b:B0 | a:ON b:ON | a:A0 b:B0 |
| 8 | | MODIFIED b:B1 | WRITE-LINE (a:A1) | a:A0 b:B0 | a:ON b:ON | a:A0 b:B0 |
| 9 | | MODIFIED b:B1 | RESPONSE:ACK | a:A1 b:B0 | a:ON b:ON | a:A0 b:B0 |
| 10 | UPDATE ADDRESS a | MODIFIED b:B1 | READ-LINE-WITH-INVALIDATE(a) | a:A1 b:B0 | a:ON b:ON | a:A0 b:B0 |
| 11 | | MODIFIED a:A2 | RESPONSE:A1 FROM MAIN MEMORY | a:A1 b:B0 | a:ON b:ON | a:A0 b:B0 |
| 12 | | MODIFIED a:A2 | WRITE-LINE (b:B1) | a:A1 b:B0 | a:ON b:ON | a:A0 b:B0 |
| 13 | | MODIFIED a:A2 | RESPONSE:ACK | a:A1 b:B1 | a:ON b:ON | a:A0 b:B0 |

FIG. 14

| | PROCESSOR | CACHE BLOCK BLK0 | SYSTEM BUS | MAIN MEMORY | FLAG MEMORY | BEFORE-IMAGE |
|---|---|---|---|---|---|---|
| 1 | | MODIFIED a:A2 | | a:A1 b:B1 | a:ON b:ON | a:A0 b:B0 |
| 2 | | MODIFIED a:A2 | READ-LINE(a) | a:A1 b:B1 | a:OFF b:ON | a:A0 b:B0 |
| 3 | | CLEAN-SHARED a:A2 | RESPONSE:A2 FROM CACHE MEMORY | a:A2 b:B1 | a:OFF b:ON | a:A0 b:B0 |
| 4 | | CLEAN-SHARED a:A2 | READ-LINE(b) | a:A2 b:B1 | a:OFF b:OFF | a:A0 b:B0 |
| 5 | | CLEAN-SHARED a:A2 | RESPONSE:B1 FROM MAIN MEMORY | a:A2 b:B1 | a:OFF b:OFF | a:A0 b:B0 |

F I G. 1 5

| | PROCESSOR | CACHE BLOCK BLK0 | SYSTEM BUS | MAIN MEMORY | FLAG MEMORY | BEFORE-IMAGE |
|---|---|---|---|---|---|---|
| 1 | | MODIFIED a:A2 | | a:A1 b:B1 | a:ON b:ON | a:A0 b:B0 |
| 2 | PROCESSOR INVALIDATES CACHE BLOCKS | | | | | |
| 3 | | INVALID | | a:A1 b:B1 | a:ON b:ON | a:A0 b:B0 |
| 4 | | INVALID | WRITE-LINE (b:B0) | a:A1 b:B1 | a:ON b:ON | a:A0 |
| 5 | | INVALID | RESPONSE:ACK | a:A1 b:B0 | a:ON b:ON | a:A0 |
| 6 | | INVALID | WRITE-LINE (b:A0) | a:A1 b:B0 | a:ON b:ON | NONE |
| 7 | | INVALID | RESPONSE:ACK | a:A0 b:B0 | a:ON b:ON | NONE |
| 8 | PROCESSOR RESETS ALL FLAG MEMORIES | | | | | |
| 9 | | INVALID | | a:A0 b:B0 | a:OFF b:OFF | NONE |

F I G. 1 6

| | PROCESSOR | CACHE BLOCK BLK0 | SYSTEM BUS | MAIN MEMORY | COUNT-ER | BEFORE-IMAGE |
|---|---|---|---|---|---|---|
| 1 | | CLEAN-SHARED a:A0 | | a:A0 b:B0 | 0 | NONE |
| 2 | UPDATE ADDRESS a | CLEAN-SHARED a:A0 | INVALIDATE (a) | a:A0 b:B0 | 0 | NONE |
| 3 | | MODIFIED a:A1 | RESPONSE:ACK | a:A0 b:B0 | 1 | NONE |
| 4 | | MODIFIED a:A1 | READ-LINE-NONE-COHERENT (a) | a:A0 b:B0 | 1 | NONE |
| 5 | | MODIFIED a:A1 | RESPONSE:A0 FROM MAIN MEMORY | a:A0 b:B0 | 1 | a:A0 |
| 6 | UPDATE ADDRESS b | MODIFIED a:A1 | READ-LINE-WITH-INVALIDATE (b) | a:A0 b:B0 | 1 | a:A0 |
| 7 | | MODIFIED b:B1 | RESPONSE:B0 FROM MAIN MEMORY | a:A0 b:B0 | 2 | a:A0 b:B0 |
| 8 | | MODIFIED b:B1 | WRITE-LINE (a:A1) | a:A0 b:B0 | 2 | a:A0 b:B0 |
| 9 | | MODIFIED b:B1 | RESPONSE:ACK | a:A1 b:B0 | 1 | a:A0 b:B0 |
| 10 | UPDATE ADDRESS a | MODIFIED b:B1 | READ-LINE-WITH-INVALIDATE (a) | a:A1 b:B0 | 1 | a:A0 b:B0 |
| 11 | | MODIFIED a:A2 | RESPONSE:A1 FROM MAIN MEMORY | a:A1 b:B0 | 2 | a:A0 b:B0 a:B1 |
| 12 | | MODIFIED a:A2 | WRITE-LINE (b:B1) | a:A1 b:B0 | 2 | a:A0 b:B0 a:B1 |
| 13 | | MODIFIED a:A2 | RESPONSE:ACK | a:A1 b:B1 | 1 | a:A0 b:B0 a:B1 |

FIG. 19

| | PROCESSOR | CACHE BLOCK BLK0 | SYSTEM BUS | MAIN MEMORY | COUNTER | BEFORE-IMAGE |
|---|---|---|---|---|---|---|
| 1 | | MODIFIED a:A2 | | a:A1 b:B1 | 1 | ~~a:A0~~ ~~b:B0~~ a:A1 |
| 2 | | MODIFIED a:A2 | READ-LINE(a) | a:A1 b:B1 | 1 | ~~a:A0~~ ~~b:B0~~ a:A1 |
| 3 | | CLEAN-SHARED a:A2 | RESPONSE:A2 FROM CACHE MEMORY | a:A2 b:B1 | 0 | a:A0 ~~b:B0~~ ~~a:A1~~ |
| 4 | | CLEAN-SHARED a:A2 | | a:A2 b:B1 | 0 | a:A0 b:B0 ~~a:A1~~ |
| 5 | | CLEAN-SHARED a:A2 | | a:A2 b:B1 | 0 | a:A0 b:B0 a:A1 |

FIG. 20

| | PROCESSOR | CACHE BLOCK BLK0 | SYSTEM BUS | MAIN MEMORY | COUNTER | BEFORE-IMAGE |
|---|---|---|---|---|---|---|
| 1 | | MODIFIED a:A2 | | a:A1 b:B1 | 1 | a:A0 b:B0 a:A1 |
| 2 | PROCESSOR INVALIDATES CACHE BLOCKS | | | | | |
| 3 | | INVALID | | a:A1 b:B1 | 1 | a:A0 b:B0 a:A1 |
| 4 | | INVALID | WRITE-LINE (a:A1) | a:A1 b:B1 | 1 | a:A0 b:B0 |
| 5 | | INVALID | RESPONSE:ACK | a:A1 b:B1 | 1 | a:A0 b:B0 |
| 6 | | INVALID | WRITE-LINE (b:B0) | a:A1 b:B1 | 1 | a:A0 |
| 7 | | INVALID | RESPONSE:ACK | a:A1 b:B0 | 1 | a:A0 |
| 8 | | INVALID | WRITE-LINE (a:A0) | a:A1 b:B0 | 1 | NONE |
| 9 | | INVALID | RESPONSE:ACK | a:A0 b:B0 | 1 | NONE |
| 10 | PROCESSOR RESETS ALL COUNTERS | | | | | |
| 11 | | INVALID | | a:A0 b:B0 | 0 | NONE |

FIG. 21

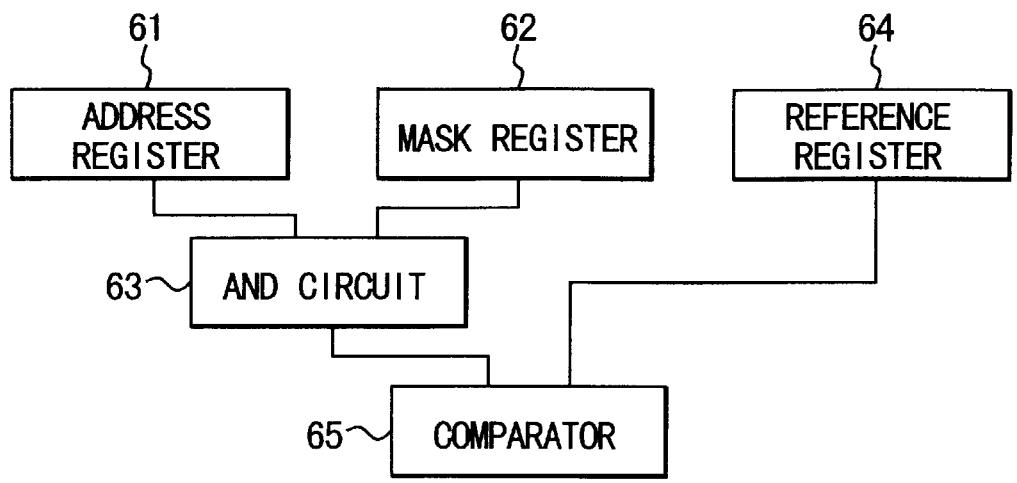
F I G. 22
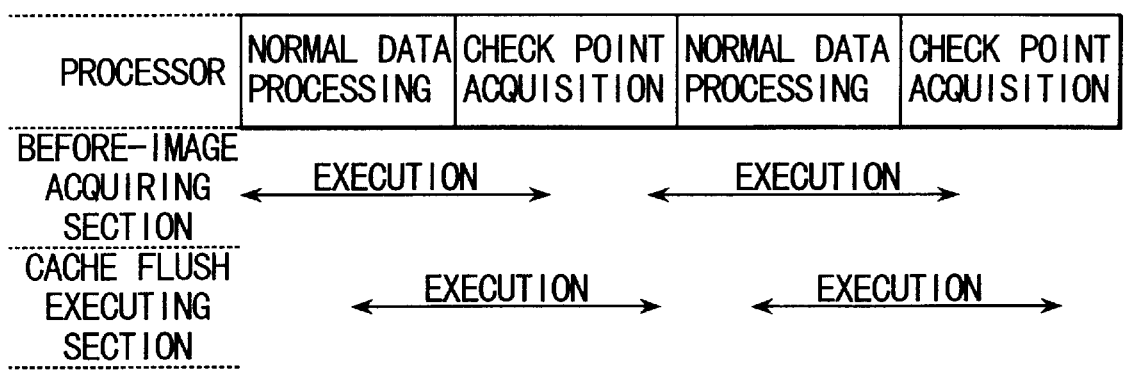
F I G. 23

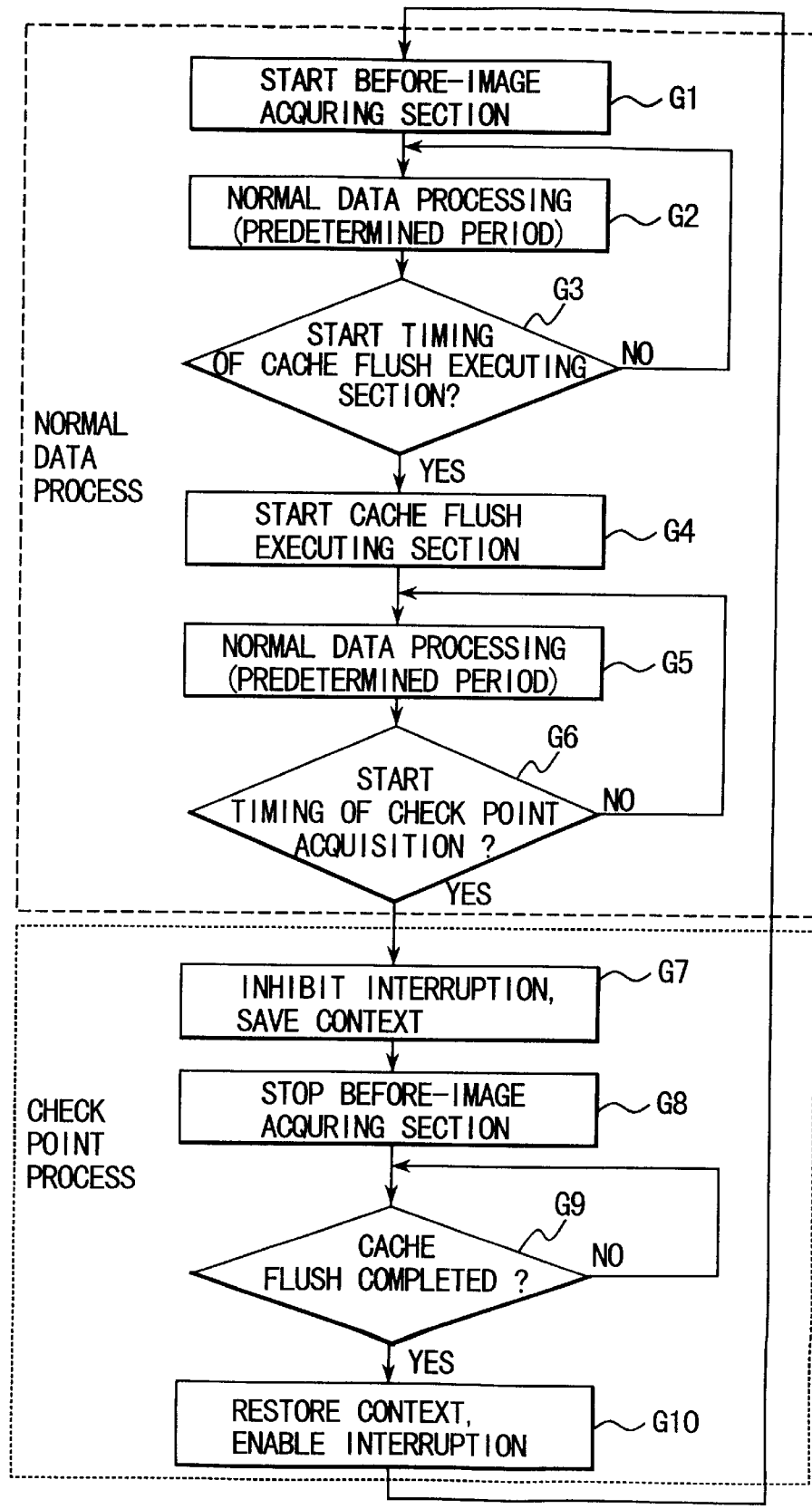
F I G. 24

| | PROCESSOR | CACHE BLOCK BLK0 | SYSTEM BUS | MAIN MEMORY | FLAG MEMORY | BEFORE-IMAGE |
|---|---|---|---|---|---|---|
| 1 | | CLEAN-SHARED a:A0 | | a:A0<br>b:B0 | a:OFF<br>b:OFF | NONE |
| 2 | UPDATE ADDRESS a | CLEAN-SHARED a:A0 | INVALIDATE (a) | a:A0<br>b:B0 | a:OFF<br>b:OFF | NONE |
| 3 | | MODIFIED a:A1 | RESPONSE:ACK | a:A0<br>b:B0 | a:ON<br>b:OFF | NONE |
| 4 | | MODIFIED a:A1 | READ-LINE-NON-COHERENT (a) | a:A0<br>b:B0 | a:ON<br>b:OFF | NONE |
| 5 | | MODIFIED a:A1 | RESPONSE:A0 FROM MAIN MEMORY | a:A0<br>b:B0 | a:ON<br>b:OFF | a:A0 |
| 6 | UPDATE ADDRESS b | MODIFIED a:A1 | READ-LINE-WITH-INVALIDATE (b) | a:A0<br>b:B0 | a:ON<br>b:OFF | a:A0 |
| 7 | | MODIFIED b:B1 | RESPONSE:B0 FROM MAIN MEMORY | a:A0<br>b:B0 | a:ON<br>b:ON | a:A0<br>b:B0 |
| 8 | | MODIFIED b:B1 | WRITE-LINE (a:A1) | a:A0<br>b:B0 | a:ON<br>b:ON | a:A0<br>b:B0 |
| 9 | | MODIFIED b:B1 | RESPONSE:ACK | a:A1<br>b:B0 | a:ON<br>b:ON | a:A0<br>b:B0 |
| 10 | PROCESSOR STARTS CACHE FLUSH EXECUTING SECTION | | | | | |
| 11 | | MODIFIED b:B1 | READ-LINE (a) | a:A1<br>b:B0 | a:OFF<br>b:ON | a:A0<br>b:B0 |
| 12 | | MODIFIED b:B1 | RESPONSE:A1 FROM MAIN MEMORY | a:A1<br>b:B0 | a:OFF<br>b:ON | a:A0<br>b:B0 |
| 13 | | MODIFIED b:B1 | READ-LINE (b) | a:A1<br>b:B0 | a:OFF<br>b:OFF | a:A0<br>b:B0 |
| 14 | | CLEAN-SHARED b:B1 | RESPONSE:B1 FROM CACHE MEMORY | a:A1<br>b:B1 | a:OFF<br>b:OFF | a:A0<br>b:B0 |
| 15 | UPDATE ADDRESS a | CLEAN-SHARED b:B1 | READ-LINE-WITH-INVALIDATE (a) | a:A1<br>b:B1 | a:OFF<br>b:OFF | a:A0<br>b:B0 |
| 16 | | MODIFIED a:A2 | RESPONSE:A1 FROM MAIN MEMORY | a:A1<br>b:B1 | a:ON<br>b:OFF | a:A0<br>b:B0<br>a:A1 |
| 17 | | MODIFIED a:A2 | READ-LINE (a) | a:A1<br>b:B1 | a:ON<br>b:OFF | a:A0<br>b:B0<br>a:A1 |
| 18 | | CLEAN-SHARED a:A2 | RESPONSE:A2 FROM CACHE MEMORY | a:A2<br>b:B1 | a:ON<br>b:OFF | a:A0<br>b:B0<br>a:A1 |

FIG. 26

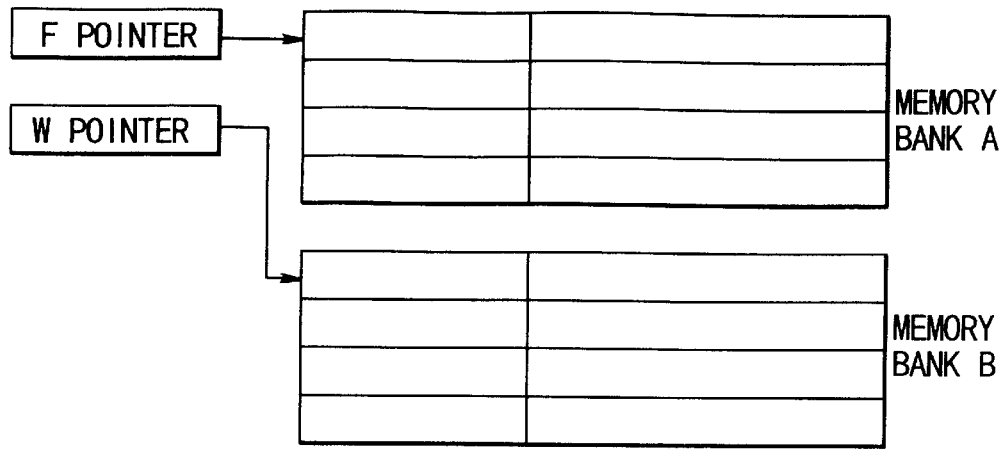
F I G. 27
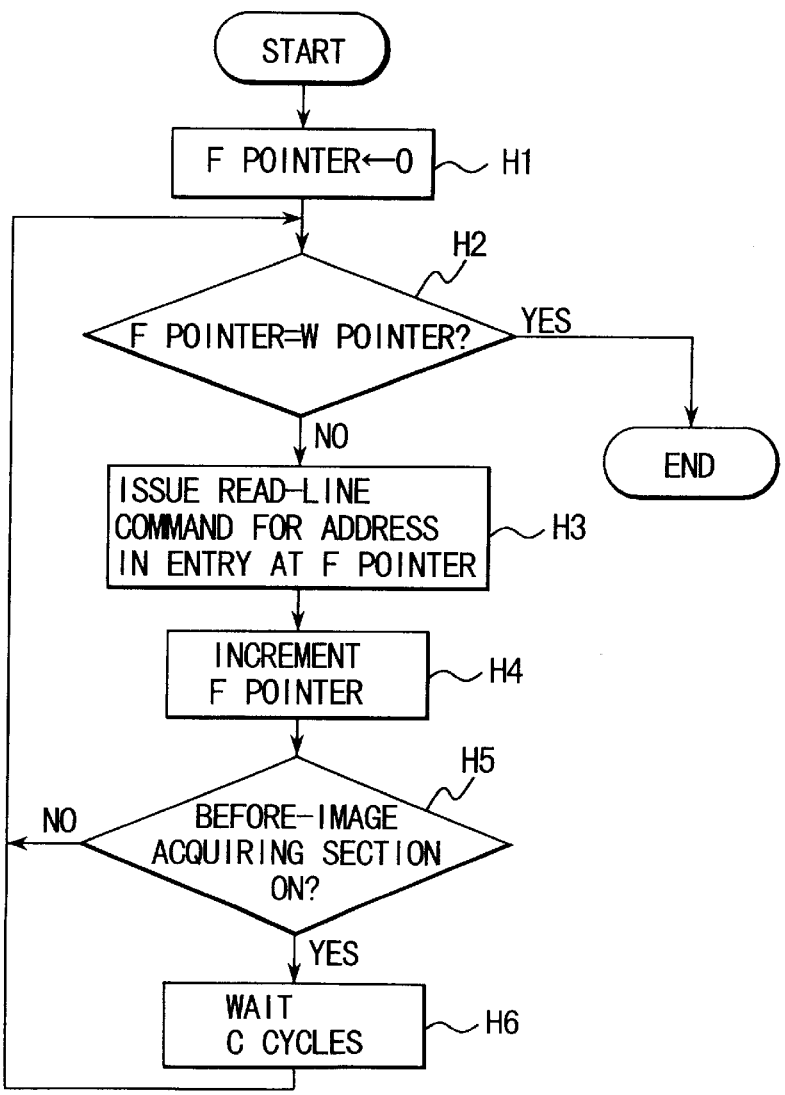
F I G. 28

CHECKPOINT ACQUISITION ACCELERATING APPARATUS

BACKGROUND OF THE INVENTION

The present invention relates to a checkpoint acquisition accelerating apparatus suitably applicable to a computer including a cache memory having a snoop function for maintaining data coherency and a computer system with a checkpoint recovery mechanism using such an apparatus.

This application is based on Japanese Patent Application No. 08-234321, filed Sep. 4, 1996, the content of which is incorporated herein by reference.

In order to improve the reliability of a computer system, a checkpoint is acquired in a main memory at regular intervals during the normal data processing, and if the computer detects some faults, the normal data processing is resumed by rolling back to the most recent checkpoint. This method is called the checkpoint/recovery method and can be roughly classified into the three types described below.

(1) A method used mainly with a data base management system using two computers in which if one of the computers goes out of order, the other computer takes over to the data base processing in order to prevent the loss of the data and maintain the data integrity.

(2) A method in which an application program is executed in duplicate in different computers as a primary process and a shadow process, respectively. If the primary process goes out of order because of a hardware failure, the shadow process takes over the role of the primary process. From the user, the execution of the application program appears to be continued without being interrupted. (3) A method in which if a fault occurs in a computer, the computer manages to avoid running out of order. The fault is not substantially transparent to the user and the application program seems to be executed as if the fault had not occurred.

According to the third checkpoint/recovery method (3), the normal data processing is resumed from the most recent checkpoint, and therefore a checkpoint is required to be stored in a memory immune to breakdown due to a fault. Such a memory unit is called a stable memory such as a duplicated memory.

In a computer of the third checkpoint and recovery type (3), as shown in FIG. 1, the normal data processing of each processor is temporarily suspended at regular time intervals to perform the checkpoint acquisition (t1), upon completion of which the normal data processing is resumed from the point of interruption (t2). If any fault occurs (t3), the processors perform the fault recovery. When the fault recovery is completed, the normal data processing is resumed (t4) after restoring the main memory to the state of the most recent checkpoint (t2).

Now, the relation between the cache memory, the main memory and the checkpoint is described below in the checkpoint/recovery method.

(Normal data processing)

To cope with a fault, to restore the main memory to the state of the most recent checkpoint.

(Checkpoint acquisition)

All the updated data stored in the cache memory are written-back into the main memory.

(Restoration from a fault)

It is necessary to restore the data in the main memory which has been updated after the most recent checkpoint to the data of the most recent checkpoint.

A specific example of a fault tolerant computer employing the checkpoint/recovery method is disclosed in Philip A. Bernstein, "Sequoia: A Fault-Tolerant Tightly Coupled Multiprocessor for Transaction Processing", IEEE Computer, Vol. 21, No. 2, 1988.

In this Sequoia computer, when a processor updates data during the period of normal data processing, the updated data is stored in the cache memory and never written-back to the main memory. With the starting of checkpoint acquisition, the updated data stored in the cache memory is written-back to the main memory. In case where a fault occurs in the computer, the cache memory is invalidated so that the normal data processing can be resumed from the state of the most recent checkpoint. This mechanism can be summarized as follows in terms of the above-mentioned relation among the cache memory, the main memory and the checkpoint.

(Normal data processing)

The data updated by the processor is not written-back to the main memory before starting the checkpoint acquisition.

(Checkpoint acquisition)

The updated data stored in the cache memory are all written-back to the main memory.

(Restoration of the main memory)

All that is required is to invalidate the cache memory.

Also, the Sequoia computer comprises a special cache memory for realizing the checkpoint/recovery recovery method. The reason is that an ordinary cache memory of write-through type or copy-back type can not be controlled to perform the operation in which "the data updated by a processor during the normal data processing is not written-back to the main memory before the beginning of a checkpoint acquisition". Therefore, a special cache memory is required.

A second specific example of a fault-tolerant computer employing the checkpoint/recovery recovery method is disclosed in U.S. Pat. No. 4,740,969 entitled "Method & Apparatus for Recovering from Hardware Faults". In this specific example, the following processes are executed.

(Normal data processing)

When data are loaded from the main memory to the cache memory, the data and the address thereof are stored into a log memory.

(Checkpoint acquisition)

Not described.

(Restoration from fault)

The main memory is restored to the state of the most recent checkpoint using the above-mentioned address and data.

In this way, the Sequoia computer requires a special cache memory for the checkpoint and recovery, and thus poses the problem that a rapid technical revolution of the processor technology can hardly be caught up with.

The method disclosed in U.S. Pat. No. 4,740,969 poses the problem that the data acquired during the normal data processing is to much since the address and data are stored at each time of data transfer from the main memory to the cache memory.

BRIEF SUMMARY OF THE INVENTION

Accordingly, it is an object of the present invention to provide a checkpoint acquisition accelerating apparatus and a checkpoint/recovery method, in which the checkpoint/recovery can be easily realized in a computer including a standard uniprocessor or a standard multiprocessor with ordinary cache memory.

Another object of the present invention is to provide a checkpoint acquisition accelerating apparatus and a checkpoint/recovery method which acquire a less amount of data in the normal data processing as compared with the method and apparatus disclosed in U.S. Pat. No. 4,740,969.

According to one aspect of the present invention, there is provided a checkpoint acquisition accelerating apparatus used for a computer comprising at least one processor having a cache memory of copy-back type with a bus snoop mechanism, a main memory and a system bus connecting the processor and the main memory, the apparatus comprising before-image memory means for storing a plurality of before-images each including a pair of the address of the updated data and the previous data, before-image acquiring means for observing a bus command indicating update of data within the cache memory and a response thereto by monitoring the system bus, if necessary, issuing to the system bus a bus command for reading the previous data held in the main memory, storing in the before-image memory means the update address and the previous data which are included in the bus command or the response, cache flush executing means for issuing to the system bus commands requesting the updated data indicated by the addresses stored in the before-image memory means to be written-back to the main memory in response to a request from the processor, and main memory restoring means for issuing to the system bus commands requesting all the previous data stored in the before-image memory means to be written into the main memory in anti-chronological order in response to a request from the processor.

In the checkpoint acquisition accelerating apparatus according to the present invention, when the processor updates data within the cache memory, the before-image acquiring means acquires the update address and the previous data and stores them in the before-image memory means. In response to a request from the processor, the cache flush executing means issues bus commands requesting the contents of all the updated cache blocks with the addresses thereof stored in the before-image memory means to be written-back to the main memory thereby to execute the cache flush. The main memory restoring means, on the other hand, issues, in response to a request from the processor, bus commands requesting all the previous data stored in the before-image memory means to be written in the main memory in anti-chronological order, thereby restoring the main memory to the state of the most recent checkpoint.

According to the checkpoint acquisition accelerating apparatus of the present invention, it is not necessary to provide a dedicated cache memory and it is expected to remarkably improve the processing speed as compared with the conventional apparatus in which the cache flush is performed by the processor using the cache flush software. Since most processing time of the checkpoint acquisition is occupied by the cache flush, the overall performance of the computer of checkpoint/recovery type can be improved.

On the other hand, the processor may update the data of the same address frequently over the successive checkpoints. Preferably, therefore, the main memory is divided into pieces of the same size as the cache blocks of the cache memory, and a flag memory with two states of "on" and "off" is associated with each pieces. If the data stored in the cache block is updated and the flag memory associated with the update address is "off", the previous data is written in the before-image memory means and the flag memory turns "on". If the data is updated again by the processor, the flag memory associated with the data is already set "on" so that it is possible to recognize that the previous data thereof is already stored in the before-image memory means. Therefore, the operation of writing the previous data in the before-image memory means can be avoided. As a result, the unnecessary operation is eliminated for further performance improvement. The flag memories are not necessarily provided for all the pieces but may effectively be provided for a part of the pieces.

It is also desirable to set a plurality of disjoint address ranges and to provide a block counter for each address range. Each block counter is managed in such a manner as to indicate the number of updated cache blocks in the corresponding address range. If a block counter has the initial value, e.g., 0, therefore, it is immediately recognizable that the cache flush is not required for the given address range, thus remarkably reducing the time required for the checkpoint acquisition.

According to another aspect of the present invention, there is provided a computer system comprising at least one processor having a cache memory of copy-back type equipped with a bus snoop mechanism, a main memory, and a system bus for connecting the processor and the main memory, the computer system further comprising the above checkpoint acquisition accelerating apparatus, data processing means for executing the normal data processing while activating the before-image acquiring means of the checkpoint acquisition accelerating apparatus, checkpoint acquisition step for storing in the main memory the context of the data processing synchronously among all the processors and performing cache flush by activating the cache flush executing means of the checkpoint acquisition accelerating apparatus, and rollback/recovery step for invalidating all the cache blocks in case of a fault, causing the main memory restoring means of the checkpoint acquisition accelerating apparatus to restore the main memory to the state of the most recent checkpoint and resuming the data processing using the information stored in the restored main memory.

In a computer system for acquiring a checkpoint at regular intervals of time for checkpoint/recovery, reducing the time consumed for a checkpoint acquisition is crucial. In other words, the overall system performance can be improved by applying the above-mentioned checkpoint acquisition accelerating apparatus to the computer system.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a diagram showing a system configuration of a computer system according to a first embodiment of the present invention;

FIG. 4 is an operation diagram of a before-image acquiring section according to the first embodiment;

FIG. 5 is an operation diagram of a cache flush executing section according to the first embodiment;

FIG. 6 is an operation diagram of a main memory restoring section according to the first embodiment;

FIG. 7 is an operation diagram of a checkpoint acquisition accelerating apparatus;

FIG. 8 is a diagram for explaining the operation for updating data by a processor according to the first embodiment;

FIG. 9 is a diagram for explaining the issue of a "Read-Line" bus command by the cache flush executing section according to the first embodiment;

FIG. 10 is a diagram for explaining the operation performed if a fault occurred before starting the checkpoint acquisition according to the first embodiment;

FIG. 11 is a diagram showing a system configuration of a computer system according to a second embodiment of the present invention;

FIG. 13 is an operation diagram of a cache flush executing section according to the second embodiment of the present invention;

FIG. 14 is a diagram for explaining the operation for updating data by a processor according to the second embodiment;

FIG. 15 is a diagram for explaining the issue of a "Read-Line" bus command by the cache flush executing section according to the second embodiment;

FIG. 16 is a diagram for explaining the operation performed if a fault occurred before starting the checkpoint acquisition according to the second embodiment;

FIG. 19 is a diagram for explaining the operation of updating the data by a processor according to the third embodiment;

FIG. 20 is a diagram for explaining the issue of a "Read-Line" bus command by the cache flush executing section according to the third embodiment;

FIG. 21 is a diagram for explaining the operation performed if a fault occurred before starting the checkpoint acquisition according to the third embodiment;

FIG. 22 is a diagram showing a mechanism for determining whether a before-image is acquired or not according to the third embodiment;

FIG. 23 is a diagram for explaining the temporal relation between the operations of the processor, the before-image acquiring section and the cache flush executing section according to a fourth embodiment of the present invention;

FIG. 24 is a diagram showing the operation diagram of a processor of early-flush scheme according to the fourth embodiment;

FIG. 26 is a diagram showing an example operation of the processor, the main memory, the before-image acquiring section and the cache flush executing section according to the fourth embodiment;

FIG. 27 is a diagram for explaining a configuration and a method of using an entry of a before-image storing section according to the fourth embodiment;

FIG. 28 is an operation diagram of a cache flush executing section according to the fourth embodiment.

DETAILED DESCRIPTION OF THE INVENTION

Figure 1:
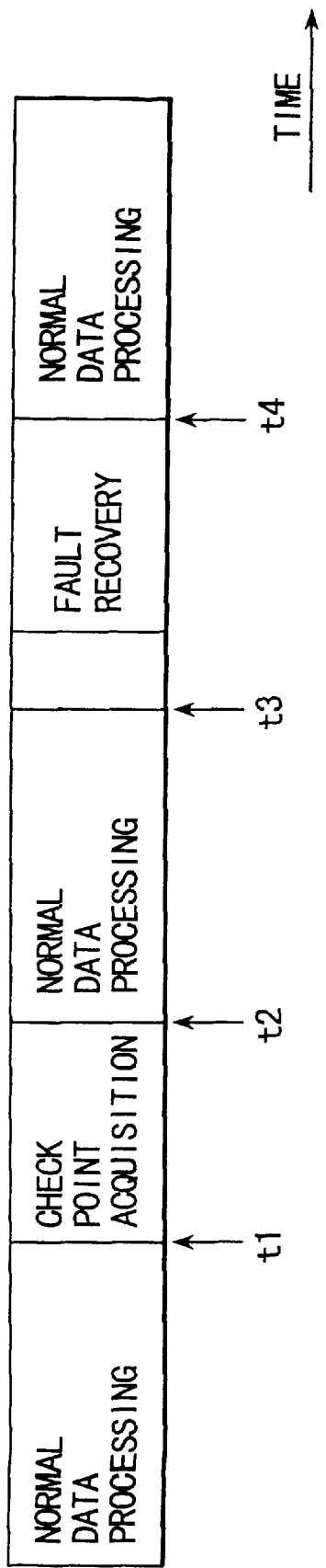
FIG. 1 is a diagram for explaining the steps of operation according to a conventional checkpoint/recovery method.

A preferred embodiment of a checkpoint acquisition accelerating apparatus according to the present invention will now be described with reference to the accompanying drawings.

(First embodiment)

FIG. 2 shows a system configuration of a computer system according to a first embodiment of the present invention. A plurality of (three, in the present case) processors 10 each including a cache memory 20 of copy-back type with a cache coherency mechanism are connected to a system bus 40. If the cache memories are configured in two or more layers of primary and secondary, the cache memory 20 means the one nearest to the system bus 40. Also, if the cache memory consists of instruction cache and data cache, the cache memory 20 according to the present embodiment means the data cache. The address on the system bus 40 of this system is assumed to have 32 bits. The system bus 40 is connected to a main memory 51 through a memory controller 50 and to a checkpoint acquisition accelerating apparatus 30.

The checkpoint acquisition accelerating apparatus 30 includes a bus interface 31, a before-image acquiring section 32, a main memory restoring section 33, a cache flush executing section 34 and a before-image storing section 35.

First, the functions of the checkpoint acquisition accelerating apparatus will be explained in connection with the software for controlling the apparatus.

(Initialization)

The processors 10 set the system to a state in which there is no cache blocks in a "Modified" state (described later) at an appropriate time.

(Normal data processing)

One of the processors 10 activates the before-image acquiring section 32 at the time beginning of the normal data processing. As long as the processors 10 are executing application programs or the operating system, the checkpoint acquisition accelerating apparatus 30 monitors the system bus 40 and, every time it detects that the processors 10 update the data in the cache memory 20, stores the address of updated data and the previous data into the before-image storing section.

(Checkpoint acquisition)

The processors 10 acquires a checkpoint acquisition at regularly after execution of the normal data processing for a predetermined length of time, e.g., for several milliseconds to several tens of milliseconds. In the checkpoint acquisition, the context (the contents of the registers of the processors and the like) of the data processing that has thus far been executed is stored in the main memory 51, while at the same time writing-back the contents of all the cache blocks in "Modified" state (the write-back operation will hereinafter be referred to as "cache flush") to the main memory 51. The checkpoint acquisition accelerating apparatus 30 realizes the cache flush by issuing to the system bus 40 a bus command requesting the contents of all the cache blocks in "Modified" state to be written-back to the main memory 51. At the end of the checkpoint acquisition, the processors 10 resume the normal data processing.

(Restoration of the main memory for a fault recovering)

If the computer system detects a fault, the processors 10 identify the cause of the fault and if required, separate the faulty device and invalidate all the cache blocks 20. The checkpoint acquisition accelerating apparatus 30, using the before-image stored therein, issues bus commands to write the previous data to the main memory 51. The main memory 51 thus is restored to the state of the most recent checkpoint. After that, the processors 10 resume the normal data processing.

Specifically, the checkpoint acquisition accelerating apparatus 30 according to this embodiment has the following three functions.

(1) Normal data processing

Upon detecting that the processors 10 have updated data, the apparatus acquires and stores the before-image of the data.

(2) Checkpoint acquisition

In accordance with a request from the processors 10, the apparatus issues bus command requesting the contents of the cache blocks in "Modified" state to be written-back (cache flush) to the main memory 51 using the address of each before-image stored in the apparatus.

(3) Restoration of the main memory

In accordance with a request from the processors 10, the apparatus issues bus command requesting the previous data to be written to the main memory 51 using the before-image stored in the apparatus.

The before-image is stored in order to realize the above functions (2) and (3). Acquisition of all the before-image, therefore, is not required. The before-image acquisition is necessary in the event of the first update occurring for a given address after a checkpoint is not necessary, but for the second and subsequent updates for the same address.

The checkpoint acquisition accelerating apparatus 30 monitors the bus commands and responses thereto on the system bus 40 or actively issues a bus command. The structure of the cache memory 20 and the system bus 40 will be explained together with the bus command and the response thereto. What is described in the following, however, is only an example of a computer to which the checkpoint acquisition accelerating apparatus according to the embodiment is applicable. For example, there are several variations of both the possible states of a cache block and the bus commands appearing on the system bus 40 and responses thereto. The checkpoint acquisition accelerating apparatus 30 according to this embodiment can of course be configured to meet any of such variations.

(System bus structure)

The system bus 40 has address/data lines and control signal lines including a bus command signal line, a modified response signal line and a shared response signal line. The command signal line is for sending various information relating to commands including information indicating the command type. The shared response signal line is used for notifying that a cache block is shared for a bus command issued by other processors or cache memories. The modified response signal line is used for notifying that the updated data of a cache block is stored for a command issued by other processors or cache memories.

(Cache block state) The possible states of a cache block are as follows:

(1) Invalid state

No effective data is stored in the cache block.

(2) "Modified" state

Updated data exist in the cache block. The same data do not exist in either of any cache block of the other processors 10 or the main memory 51.

(3) Clean-shared state

The data of the cache block exists in the main memory 51. The same data may exist also in same cache blocks of the other cache memories 20.

(4) "Clean-Exclusive" state

The data of the same cache block exists in the main memory 51. The same data do not exist in any cache blocks of the other cache memories 20.

(Command and response specifications)

Five bus commands and the responses to the bus commands from the cache memory 20 or from the main memory controller 50 are described below.

(1) "Read-Line" (request to read the cache block data)

Situation for issue: If the processor 10 tries to read data which does not exist in the cache memory 20.

Response (case 1): If a cache memory 20 has the data in "Modified" state, the cache memory 20 asserts the modified response signal line and transfers the data to the main memory 51 and the cache memory 20 that has issued the "Read-Line" bus command. The cache blocks of the two cache memories 20 becomes "Clean-Shared".

Response (case 2): If a cache memory 20 has the data in "Modified" state but another cache memory 20 has a cache block in "Clean-Shared" state or in "Clean-Exclusive" state, the cache memory 20 asserts the shared response signal line. The main memory 51 or the cache memory 20 transfers the data to the cache memory 20 that has issued the "Read-Line" bus command. Which transfers the data, the main memory 51 or the other cache memory 20, depends on the computer involved. The cache blocks of the two memories are "Clean-Shared".

Response (case 3): In other case, neither the modified response signal line nor the shared response signal line is asserted, and data are transferred from the main memory 51 to the cache memory 20 that has issued the "Read-Line" bus command. The state of the cache block becomes "Clean-Exclusive".

(2) "Read-Line-with-Invalidate" (request to read data of a cache block and invalidate the other cache blocks)

Situation for issue: The processor 10 tries to update data absent in the cache memory 20.

Response (case 1): If a cache memory 20 having the data in "Modified" state, the cache memory 20 asserts the modified response signal line, and transfers the data to the main memory 51 and the cache memory 20 that has issued the "Read-Line-with-Invalidate" bus command. In some computers, the cache memory 20 having the data in "Modified" state issues a "Retry" response and writes the data to the main memory 51, and upon the second issue of the same bus command by the cache memory 20 that has issued the "Read-Line-with-Invalidate" bus command, the main memory 51 responds to the second bus command (see the case 3 described below). This embodiment assumes the former case by way of explanation. The cache block of the cache memory that has issued the "Read-Line-with-Invalidate" bus command becomes "Modified", while the cache block of the other cache memory that has responded becomes invalidated.

Response (case 2): If a cache memory 20 has the data in "Clean-Shared" state or in "Clean-Exclusive" state, the cache memory 20 asserts the shared response signal line. The main memory 51 or the cache memory 20 that stores the same data as the memory 51 transfers the data to the cache memory 20 that has issued the "Read-Line-with-Invalidate" bus command. The cache block of the cache memory that has issued the "Read-Line-with-Invalidate" bus command becomes "Modified", and the cache block of cache memory that has responded becomes invalidated.

Response (case 3): Otherwise, neither the modified response signal line nor the shared response signal line is asserted, and the data are transferred from the main memory 51 to the cache memory 20 that has issued the "Read-Line-with-Invalidate" bus command. The cache block becomes "Modified".

(3) "Write-Line" (command to write cache block data into the main memory)

Situation for issue: If a cache block in which data of a given address have become required to be stored, and the cache block has data of a different address in "Modified" state, the content is written back to the main memory 51 by using a "Write-Line" bus command.

Response: The main memory 51 is updated by the data contained in the command. The state of the cache block becomes "Clean-Shared".

(4) "Invalidate" (request to invalidate the data of other cache memories. Only the address is transferred.)

Situation for issue: The processor 10 tries to update the data of a cache block in "Clean-Shared" state.

Response: The cache block of the cache memory that has issued this bus command changes to "Modified" state, and the cache block of the other cache memory that has the same data, if any, becomes invalid state.

(5) "Read-Line-Non-Coherent" (request to read the data in the main memory)

Situation for issue: Used for data transfer from the main memory 51 to I/O devices by DMA (direct memory access) or the like.

Response: Regardless of the state of the cache memory 20, the content of the address requested is always returned as a response by the main memory controller 50. The cache block state remains unchanged.

The foregoing is a description of the cache memory 20 and the system bus 40 according to the present embodiment.

(Configuration of checkpoint acquisition accelerating apparatus)

The checkpoint acquisition accelerating apparatus 30 comprises a before-image storing section 35, a before-image acquiring section 32, a cache flush executing section 34 and a main memory restoring section 33.

Figure 3:
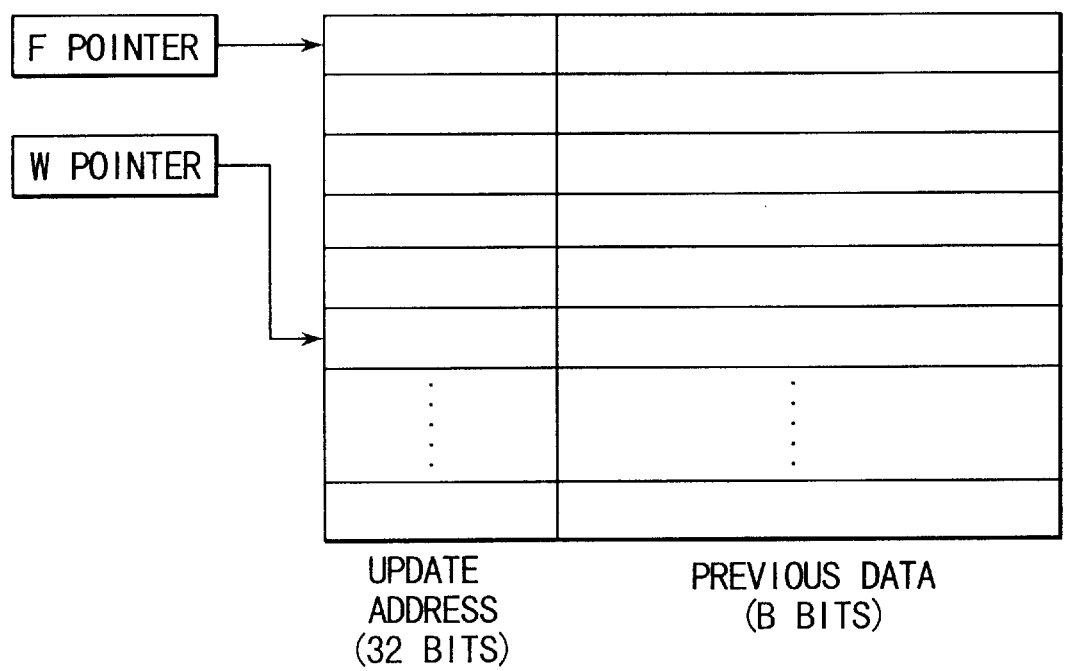
FIG. 3 is a schematic diagram showing a structure of a before-image storing section according to the first embodiment.

The before-image storing section 35, as shown in FIG. 3, is configured of a plurality of entries for storing a pair of an update address and a previous data, an F pointer used by the cache flush executing section 34, and a W pointer used by the before-image acquiring section 32 and the main memory restoring section 33.

A previous data stored in the before-image storing section 35 has the same size (assumed to be B bits in this embodiment) as the cache block. This is in order to assure the same size of data as the data transferred between the cache memories 20 and between the cache memory 20 and the main memory 51. The address has 32 bits.

The W pointer indicates an entry for storing the before-image newly acquired by the before-image acquiring section 32. With the activation of the before-image acquiring section 32 in response to a request from the processor 10, the W pointer is initialized so as to indicate the first entry. Just after the before-image newly acquired by the before-image acquiring section 32 is stored in the entry indicated by the W pointer, the W pointer is incremented by one to indicate the next entry. When the main memory restoring section 33 is activated by a request from the processor 10, the W pointer is decremented by one and the previous data in the entry indicated by W pointer is written to the main memory 51. The operation is repeated until W pointer reaches the first entry.

The F pointer indicates an entry storing the before-image to be processed next by the cache flush executing section 34. When the cache flush executing section 34 is activated by a request from the processor 10, the F pointer is initialized so as to indicate the first entry. The cache flush executing section 34 then issues a "Read-Line" bus command to the update address stored in the entry indicated by the F pointer and thereby increments F pointer by one to indicate the next entry. The operation is repeated until the F pointer and the W pointer indicate the same entry. The cache flush executing section 34 ends the cache flush operation.

The before-image acquiring section 32 monitors the bus commands and responses on the system bus 40 or issues a bus command if necessary. In this way, when the processor 10 updates data in the cache memory 20, the before-image thereof is stored in the before-image storing section 35. The operation performed when the before-image acquiring section 32 has detected a bus command is described below.

(1) "Read-Line"

The before-image acquiring section 32 asserts the shared response signal line.

(2) "Read-Line-with-Invalidate"

The before-image acquiring section 32 does nothing if the modified response signal line is asserted. Otherwise, the before-image acquiring section 32 stores the update address contained in the bus command and the previous data contained in the response from a cache memory 20 or the main memory 51 into the before-image storing section 35.

(3) "Invalidate"

The before-image acquiring section 32 issues the "Read-Line-Non-Coherent" bus command using the update address contained in the bus command. The update address and the previous data contained in the response from the main memory 51 are stored in the before-image storing section 35.

FIG. 4 shows the operation diagram of the before-image acquiring section 32.

At step A1, the W pointer is set to 0, and at step A2 it waits for a bus command. In this mode, step A3, A5 or A7 is selected in accordance with the bus command issued to the bus line.

At step A3, upon detection of a "Read-Line" bus command, the before-image acquiring section 32 asserts the shared response signal line at step A4 and returns to step A2. The reason for asserting the shared response signal line is to prevent the cache block from changing to the "Clean-Exclusive" state. Assume the processor 10 updates the data of a cache block in "Clean-Exclusive" state. "Clean-Exclusive" means that the other cache memories 20 do not held this data. Therefore, "Clean-Exclusive" state is changed to "Modified" state without issuing any bus command, which means the before-image acquiring section 32 is not informed the data update. In view of this, according to the present invention, upon assertion of the shared response signal line by the before-image acquiring section 32, the cache block changes to the "Clean-Shared" state, and the "Invalidate" bus command is issued to the system bus 40 when the processor 10 updates the data and thereby making it possible to acquire the before-image.

At step A5, upon detection of the "Read-Line-with-Invalidate" bus command, it is decided at step A6 whether or not the modified response signal line has been asserted. If the modified response signal line is asserted, it means that some other cache memory 20 hold the data in "Modified" state (i.e., it indicates that the before-image corresponding to the data has been already stored in the before-image storing section 35). In this case, therefore, the before-image need not to be stored again. If the modified response signal line is not asserted, on the other hand, the response from the cache memory 20 or from the main memory 51 contains the previous data. At step A9, therefore, the before-image acquiring section 32 extracts the previous data. After that, the before-image is written in the entry indicated by the W pointer at step A10, and the W pointer is incremented by one at step A11. Then, the before-image acquisition is completed and the process returns to step A2.

In this way, as compared with the prior art in which the before-image is acquired each time data is transferred to the cache memory from the main memory, the present invention manages to reduce the number of the before-image to be acquired, and therefore the required size of the before-image storing section 32 can be less and the cache flush time is reduced.

At step A7, upon detection of the "Invalidate" bus command, since this bus command and the response thereto contain no previous data, the before-image acquiring section 32 issues a "Read-Line-Non-Coherent" bus command at step A8. Then the main memory controller returns a response containing the previous data. If the "Read-Line" bus command instead of "Read-Line-Non-Coherent" bus command were issued, the cache block would make a response containing the update data. This is why the "Read-Line-Non-Coherent" bus command must be used.

After that, steps A9 to A11 are executed.

Now, the operation of the cache flush executing section 34 will be explained with reference to FIG. 5.

In accordance with a request from the processor 10, the cache flush executing section 34 set the F pointer to indicate the first entry at step B1 and then determines whether or not the F pointer coincides with the W pointer at step B2. If the F pointer is equal to the W pointer, the cache flush operation is terminated.

If the F pointer is not equal to the W pointer, at step B3 a "Read-Line" bus command is issued using the update address in the entry indicated by the F pointer, and the F pointer advances at step B4. The "Read-Line" bus command is issued in order to transfer the data of a given address stored in "Modified" state in a given cache block, if any, to the main memory 51 also and thus to utilize the property of the "Read-Line" bus command and the response thereto changing the cache block from the "Modified" state to the "Clean-Shared" state. After advancing the F pointer by one, the process returns to step B2.

As described above, the cache flush executing section 34 issues "Read-Line" bus commands for all the addresses stored in the before-image storing section 35. A overhead occurs when a cache block holding the data of address a in "Modified" state during the normal data processing has written-back the data of address a to the main memory 51 in order to hold the data of address b. In this case, the before-image storing section still holds the before-image of address a and thus the cache flush executing section 34 undesirably issues a "Read-Line" bus command for address a. A method for solving this problem will be explained with reference to other embodiments.

The operation of the main memory restoring section 33 in response to a request from the processor 10 will be explained with reference to FIG. 6. First, it is determined whether or not the W pointer is 0 at step C1. If the W pointer is 0, the operation is terminated. Otherwise, the main memory restoring section 33 decrements the W pointer by one at step C2, followed by step C3 in which the before-image in the entry indicated by the W pointer is written-back to the main memory using a "Write-Line" bus command. If there are two or more before-images for address a, the before-image acquired earlier is required to be written-back to the main memory later in order to restore the state of the most recent checkpoint. Consequently, decrementing the current entry indicated by the W pointer by one toward the first entry is the easiest method of satisfying the above-mentioned restrictive condition.

Now, a method of controlling the checkpoint acquisition accelerating apparatus by the processor 10 will be explained with reference to FIG. 7.

In the normal data processing, the before-image acquiring section 32 is activated at step J1, and then an application program or the operating system is executed at step J2. It is determined at step J3 whether or not the normal data processing has continued for a predetermined length of time. If Yes at step J3, the normal data processing is suspended, and the checkpoint acquisition is started.

In the checkpoint acquisition, the processor 10 is set to interrupt-inhibit mode to inhibit any interrupt from external devices at step J4. This is in order not to execute the normal data processing during the checkpoint acquisition. The only exception is an interrupt for notifying a fault of the computer, which is given a higher priority than the normal interrupt and is required to be accepted even when the processor 10 is in the interrupt-inhibit mode. At step J4, the processor 10 activates the cache flush executing section 34, and the context, i.e., the contents of the register at the end of the normal data processing are written in the appropriate address in the main memory 51.

At step J5, the processor 10 stops the before-image acquiring section 32 and waits until the cache flush executing section 34 completes the operation at step J6. Finally, the context stored in the main memory 51 at step J4 is re-loaded to the corresponding registers and the interrupt-enable mode is set at step J7, thereby restarting the normal data processing.

Now, explanation will be made about the operation of the checkpoint acquisition accelerating apparatus 30.

(Initialization)

The processor 10 sets all the cache blocks to states other than the "Modified" state by executing appropriate software.

(Normal data processing)

The processor 10 activates the before-image acquiring section 32 at the beginning of the normal data processing. With reference to FIG. 8, explanation will be made about the case in which the processor 10 performs the normal data processing of updating the data of address a from A0 to A1, the data of address b from B0 to B1 and the data of address a from A1 to A2, in this order. Addresses a and b are assumed to correspond to the cache block BLK0, which initially holds the data A0 of address a in "Clean-Shared" state.

1: Indicates the initial state

2: The processor 10 tries to update the data of address a to A1. Since the cache block BLK0 holds the data of address a in "Clean-Shared" state, an "Invalidate" bus command is issued for address a.

3: The other cache memories 20 having the data invalidate the cache block of address a, if any, and returns a response indicating the completion. The data in the cache memory 20 is updated from A0 to A1.

4: The before-image acquiring section 32 issues a "Read-Line-Non-Coherent" bus command to address a.

5: The main memory 51 responds with data A0. The before-image acquiring section 32 stores the pair of address a and data A0 in the before-image storing section 35.

6: The processor 10 tries to update the data of address b to B1. Since the cache block BLK0 stores the data A1 of address a in "Modified" state, a "Write-Line" bus command for writing back the data A1 of address a is stored temporarily in the write buffer, and a "Read-Line-with-Invalidate" bus command is issued first for address b.

7: The main memory 51 returns a response including the data B0. This operation is performed immediately after initialization, and therefore the modified response signal line is not asserted because no other cache memories hold the data in "Modified" state. In this process, the before-image acquiring section 32 stores the set of address b and data B0 in the before-image acquiring section 35.

8: The "Write-Line" bus command for the address a suspended within the write buffer is issued.

9: The data of address a of the main memory 51 changes to A1.

10: The processor 10 tries to update the data of address a to A2. Since the cache block BLK0 stores the data B1 of address b in "Modified" state, a "Write-Line" bus command for writing-back the data of address b is temporarily stored in the write buffer, and the "Read-Line-with-Invalidate" bus command to address a is issued first.

11: The main memory 51 returns a response containing the data A1. The before-image acquiring section 32 stores the pair of address a and data A1 in the before-image storing section 35.

12: The "Write-Line" bus command for address b suspended within the write buffer is issued.

13: The data of address b of the main memory 51 is changed to B1.

An example operation of the processor 10, the main memory 51 and the before-image acquiring section 32 for normal data processing was explained above.

(Checkpoint acquisition)

Under the above-mentioned condition, suppose that the processor 10 activates the cache flush executing section 34. The cache flush executing section 34 issues a "Read-Line" bus command for address a, address b and address a, in this order, as is shown in FIG. 9. The underlines attached in the before-image column specify the positions indicated by the F pointer.

1: Indicates the initial state.

2: The cache flush executing section 34 issues a "Read-Line" bus command for address a using the before-image of the address a indicated by the F pointer.

3: BLK0 stores the data A2 of address a in "Modified" state, and therefore the modified response signal line is asserted. The write-back of data A2 to the main memory 51 is performed and the main memory 51 changes to A2. BLK0 changes "Clean-Shared" state.

4: The cache flush executing section 34 issues a "Read-Line" bus command for address b using the before-image address b.

5: BLK0 stores the data of address a in "Clean-Shared" state, and therefore neither the modified response signal line nor the shared response signal line is asserted. The main memory 51 responds with data B1. The state of BLK0 remains unchanged.

6: The cache flush executing section 34 issues a "Read-Line" bus command for address a using the before-image address a.

7: BLK0 is in "Clean-Shared" state and therefore the shared response signal line is asserted. The main memory 51 responds with A2. The state of BLK0 remains unchanged.

Upon completion of the operation of the cache flush executing section 34, the contents of all the cache blocks that have thus far been in "Modified" state are written-back to the main memory 51. At the same time, the cache blocks change to the "Clean-Shared" state. This is the same state as at the beginning of the normal data processing. Therefore, the processor 10 can immediately start the normal data processing.

An example operation of checkpoint acquisition of the cache flush executing section 34 during a checkpoint acquisition explained above.

(Restoration of the main memory)

If some fault occurs in the computer system, the processor 10 identifies the cause of the fault and, if necessary, separates the affected devices. At the same time, the processor 10 invalidates all the cache blocks. The main memory restoring section 33 of the checkpoint acquisition accelerating apparatus 30 issues "Write-Line" bus commands using the before-images, so that the main memory 51 is returned to the state of the most recent checkpoint.

Explanation will be made with reference to FIG. 10 showing the case in which a fault occurs before starting the checkpoint acquisition as described above.

1: Indicates the initial state.

2: The processor 10 invalidates all the cache blocks.

3: As a result of execution of this bus command, BLK0 changes to "invalid" state.

4: The main memory restoring section 33 issues a "Write-Line" bus command on the basis of the last-acquired before-image of data A1 and address a.

5: Data A1 is written to address a of the main memory 51. The original data, however, is A1 and remains unchanged.

6: The main memory restoring section 33 issues a "Write-Line" bus command on the basis of the before image of data B0 and address b.

7: The address b of the main memory 51 changes to B0.

8: The main memory restoring section 33 issues a "Write-Line" bus command on the basis of the before image of the data A0 and address a which were acquired first.

9: The address a of the main memory 51 changes to A0.

As a consequence, the main memory 51 returns to the state of the most recent checkpoint.

An example operation of the main memory restoring section 33 was explained above.

As described above, in an application of the checkpoint acquisition accelerating apparatus 30 according to this embodiment, an efficient cache flush operation is realized for the computer system having a standard configuration without any specific cache memory. At the same time, it becomes possible to construct a high-performance computer system of checkpoint recovery type.

(Second embodiment)

Now, a second embodiment of the present invention will be explained. FIG. 11 shows a system configuration of a computer system according to the second embodiment. The configuration of the computer using a checkpoint acquisition accelerating apparatus 30A is the same as that in the first embodiment.

The checkpoint acquisition accelerating apparatus 30A according to this embodiment has a flag memory 36 added to the configuration of the first embodiment. The flag memory 36 is realized as one hardware unit with the before-image storing section 35A.

The flag memory 36 is an area for storing 1-bit information for each cache block unit of the main memory 51. Only a portion of the main memory 51 may be configured with the flag memory 36. The flag memory 36 is controlled to turn on only if the before-image for a given address is stored in the before-image storing section 35A and the cache flush executing section 34A has not yet issued a "Read-Line" bus command to the given address. If the flag memory 36 is turned on for a given address, therefore, it indicates that the cache flush executing section 34A is expected to issue a "Read-Line" bus command to that address in the future. Also, all the flag memories 36 are in off state at the time of initialization completion or at the time of checkpoint acquisition completion.

Figure 12:
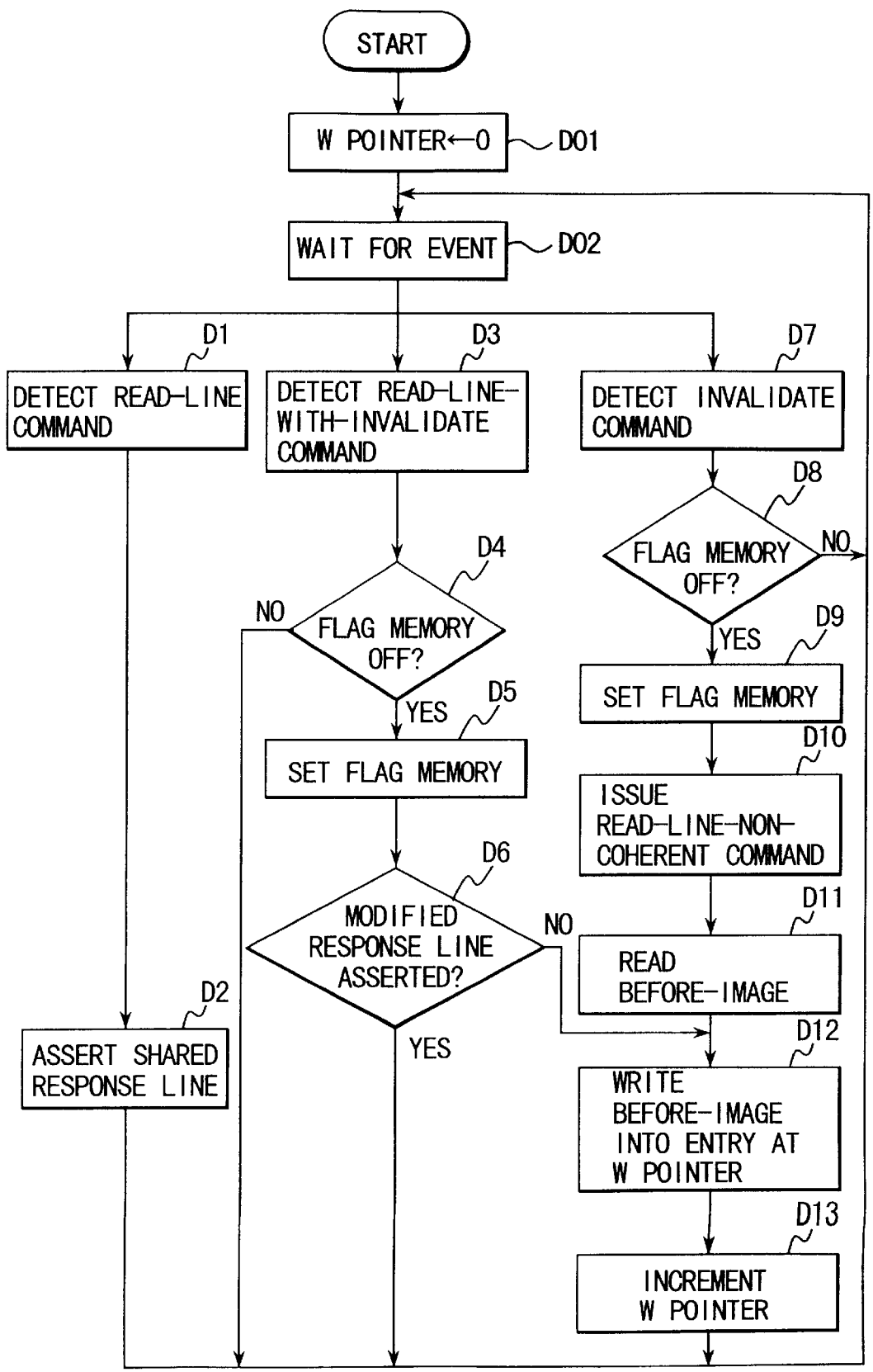
FIG. 12 is an operation diagram of a before-image acquiring section according to the second embodiment.

The before-image acquiring section 32A is identical to the corresponding section of the first embodiment as far as the portions thereof for acquiring the before-image is concerned. Nevertheless, the before-image acquiring section 32A is different from the corresponding section of the first embodiment in that the process of referencing and/or updating the flag memory 36 is added and that the before-image may not be stored depending on the value of the flag memory 36. The operation diagram of the before-image acquiring section 32A is shown in FIG. 12.

At step D01, the W pointer is set to 0, and at step D02, an event is waited for. Under this condition, step D1, D3 or D7 is selected in accordance with the bus command issued to the bus line.

As shown at step D1, upon detection of a "Read-Line" bus command, as in the first embodiment, the shared response signal line is asserted at step D2 and the process returns to step D02.

As shown at step D3, upon detection of the "Read-Line-with-Invalidate" bus command, the before-image acquiring section 32A refers to the value of the flag memory 36 corresponding to the update address at step D4. As long as the flag memory 36 is on, the before-image is not required to be acquired or stored, and therefore the process returns to step D02.

The reason that the before-image is not required to be acquired or stored if the flag memory 36 is on is described below.

(1) The flag memory 36 is turned on only when the before-image acquiring section 32A acquires the before-image and stores it in the before-image storing section 35A. If the flag memory 36 is on for a given address, therefore, the before-image for the given address is stored, so that the main memory restoring section 33A correctly operates.

(2) Also, when the flag memory 36 in on state for a given address, it indicates that the cache flush executing section 34A is expected to issue a "Read-Line" bus command to the given address in the future. Consequently, the before-image is not required to be stored for the benefit of the cache flush executing section 34A as long as the flag memory 36 is on.

If the flag memory is off, on the other hand, it is changed to on state at step D5, after which the before-image is acquired by the same method as in the first embodiment. Specifically, it is determined at step D6 whether or not the modified response signal line is asserted. If the modified response signal line is asserted, it indicates that the other cache memories 20 have so far stored the data in "Modified" state (i.e., the before-image for the given address is already stored in the before-image storing section 35A). In such a case, therefore, the before-image is not stored but the process returns to step D02. If the modified response signal line is not asserted, by contrast, a response containing the previous data is received from the cache memory 20 or the main memory 51. The before-image acquiring section 32A, therefore, extracts such data at step D11. After that, the before-image is written in the entry indicated by the W pointer at step D12, and the W pointer is incremented by +1 at step D13. The process is then returned to step D02.

In the absence of the flag memory 36 corresponding to a given address, the before-image for the given address is constantly sampled and stored. In other words, the same operation as in the first embodiment is performed for such an address.

As shown at step D7, a similar operation is performed upon detection of an "Invalidate" bus command. Specifically, the before-image acquiring section 32A refers to the value of the flag memory 36 corresponding to an update address at step D8. If the flag memory is set, that is, in on state, there is no need to acquire or store the before-image, and therefore the process returns to step D02. If the flag memory is not set, that is, in off state, on the other hand, the flag memory is set at step S9 and then the before-image is acquired in the same manner as in the first embodiment. In other words, since this bus command or the response thereto contains no data, the before-image acquiring section 32A issues a "Read-Line-Non-Coherent" bus command and acquires the previous data contained in the response from the main memory 51 at step D10. Assuming that a "Read-Line" bus command is issued in the process, the cache block storing the updated data gives a response, and therefore the previous data cannot be obtained. It is therefore necessary to issue a "Read-Line-Non-Coherent" bus command.

After that, steps D11 to D13 are executed.

FIG. 13 is a flowchart showing the process in the cache flush executing section 34A. As compared with the cache flush executing section 34 of the first embodiment, the cache flush executing section 34A is added with a mechanism for turning off the flag memory 36 when a "Read-Line" bus command is issued.

After the F pointer indicates the first entry as shown at step E1, the cache flush executing section 34A determines whether or not the F pointer coincides with the W pointer at step E2 in response to a request from the processor 10. If the F pointer is equal to the W pointer, the cache flush process is terminated. At the same time, all the cache blocks are in "Invalid" or "Clean-Shared" state.

If the F pointer and the W pointer are not equal to each other, on the other hand, a "Read-Line" bus command is issued at step E3 using the update address in the entry indicated by the F pointer, and the E pointer is advanced at step E4. A "Read-Line" bus command is issued for the purpose of utilizing the property of a "Read-Line" bus command and the response thereto in which the data of the address of a cache block stored in "Modified" state, if any, is transferred also to the main memory and the state of the given cache block changes from the modified to "Clean-Shared" state. After advancing the F pointer by one, the flag memory is turned off at step E5 and the process is returned to step E2.

In the absence of the flag memory 36 corresponding to a given address, step E5 is omitted in the processing flow shown in FIG. 13.

The main memory restoring section 33A is identical to the main memory restoring section 33 of the first embodiment.

Now, explanation will be made with regard to the operation of the checkpoint acquisition accelerating apparatus 30A according to the second embodiment.

(Initialization)

The processor 10 turns off all the flag memories 36. At the same time, the processor 10 sets all the cache blocks in other than "Modified" state by executing the appropriate software.

(Normal data processing)

The processor 10 activates the before-image acquiring section 32A at the time point of starting the normal data processing. With reference to FIG. 14, explanation will be made about the normal data processing in which the processor 10 updates the data of address a from A0 to A1, the data of address b from B0 to B1 and the data of address a from A1 to A2, in that order. Addresses a and b are assumed to both correspond to the cache block BLK0, which stores the data A0 of address a in "Clean-Shared" state initially.

1: Indicates the initial state

2: The processor 10 tries to update the data of address a to A1. Since the cache block BLK0 stores the data of address a in "Clean-Shared" state, however, an "Invalidate" bus command is issued for address a.

3: The other cache memories 20 having the same data invalidate the cache block of address a, if any, and returns a response indicating the process termination.

4: Since the flag memory 36 corresponding to address a is off, the before-image acquiring section 32A turns it on and issues a "Read-Line-Non-Coherent" bus command for address a.

5: The main memory 51 responds with data A0. The before-image acquiring section 32A stores the set of address a and the data A0 in the before-image storing section 35A.

6: The processor 10 tries to update the data of address b to B1. Since the cache block BLK0 stores the data A1 of address a in "Modified" state, however, the "Write-Line" bus command for writing back the data of address a is stored temporarily in a write buffer, and a "Read-Line-with-Invalidate" bus command is issued for address b first.

7: The main memory 51 returns a response with the data B0. Since the flag memory 36 corresponding to address b is off, the before-image acquiring section 32A turns on the flag memory 36, and stores the set of the address b and the data B0 in the before-image storing section 35A.

8: A "Write-Line" bus command for the address a thus far stored in the write buffer is issued.

9: The address a of the main memory 51 changes to A1.

10: The processor 10 tries to update the data of address a to A2. Since the cache block BLK0 stores the data B1 of address b in "Modified" state, however, a "Write-Line" bus command for writing back the data of address b is temporarily stored in the write buffer, and a "Read-Line-with-Invalidate" bus command for address a is issued first.

11: The main memory 51 returns a response with the data A1. The before-image acquiring section 32A stores no before-image since the flag memory 36 corresponding to address a is on.

12: A "Write-Line" bus command for address a thus far stored in the write buffer is issued.

13: The data of address a of the main memory 51 is changed to A1.

An example operation of the processor 10, the main memory 51 and the before-image acquiring section 32A for normal data processing were explained above.

(Checkpoint acquisition)

Under the above-mentioned condition, suppose that the processor 10 has activated the cache flush executing section 34A. The cache flush executing section 34A issues a "Read-Line" bus command for address a and address b, in that order. The manner in which the bus command is so issued is shown in FIG. 15. The underlines attached in the before-image column represent the positions indicated by the F pointer.

1: Indicates the initial state.

2: The cache flush executing section 34A first issues a "Read-Line" bus command for address a using the set of the data A0 and the before-image address a.

3: BLK0 stores the data A2 of address a in "Modified" state, and therefore the modified response signal line is asserted. The write-back to the main memory 51 thus is performed so that the data at the address a of the main memory 51 changes to A2. BLK0 is changed to "Clean-Shared" state.

4: The cache flush executing section 34A turns off the flag memory 36 corresponding to address b and issues a "Read-Line" bus command for address b using the set of the before-image address b and the data B0.

5: BLK0 stores the data of address a in "Clean-Shared" state, and therefore neither the modified response signal line nor the shared response signal line is asserted. The main memory 51 responds with B1. The state of BLK0 remains unchanged.

Upon completion of operation of the cache flush executing section 34A, the contents of all the cache blocks that have thus far been in "Modified" state are written-back to the main memory 51. At the same time, the cache blocks are changed to the "Clean-Shared" state. Also, the value of all the flag memories 36 is turned off. This is the same state as immediately after initialization. Upon completion of operation of the cache flush executing section 34, therefore, the processor 10 can immediately start the normal data processing.

An example operation of checkpoint acquisition of the cache flush executing section 34A using the before-image was explained above.

(Restoration from a fault)

If some fault occurs in the computer, the processor 10 identifies the point of fault and, if necessary, separates the affected devices. At the same time, all the cache blocks are invalidated. The main memory restoring section 33A of the checkpoint acquisition accelerating apparatus 30A issues a "Write-Line" bus command using the before-image. In this way, the main memory 51 is returned to the state of the most recent checkpoint.

The manner of restoring from a fault that occurs before starting the checkpoint acquisition described above will be explained with reference to FIG. 16.

1: Indicates the initial state.

2: The processor 10 executes the bus command for invalidating all the cache blocks.

3: As a result of execution of this bus command, BLK0 changes to an invalid state.

4: The main memory restoring section 33A issues a "Write-Line" bus command on the basis of the data B0 and the address b.

5: The data at address b of the main memory 51 is changed to B0.

6: The main memory restoring section 33A issues a "Write-Line" bus command on the basis of the data A0 and the address a.

7: The data at address a of the main memory 51 is changed to A0.

8: The processor 10 turns off all the flag memories 51.

9: As a result, the main memory 51 returns to the same state as at the time of completion of the checkpoint acquisition.

An example operation of the main memory restoring section 33A at the time of restoring from a fault was explained above.

The flag memory 36 is not necessarily provided for all the addresses. If a given address lacks a corresponding flag memory 36, the before-image acquiring section 32A acquires the before-image for the given address and stores it in the before-image storing section 3A.

In this way, in the checkpoint acquisition accelerating apparatus 30A according to this embodiment, the provision of the flag memory 36 can avoid the before-image for the same address being stored in the before-image storing section 35A twice or more. Also, upon completion of execution of the cache flush executing section 34A, all the flag memories 36 are turned off. The processor 10 can thus start the normal data processing immediately. (Third embodiment)

Figure 17:
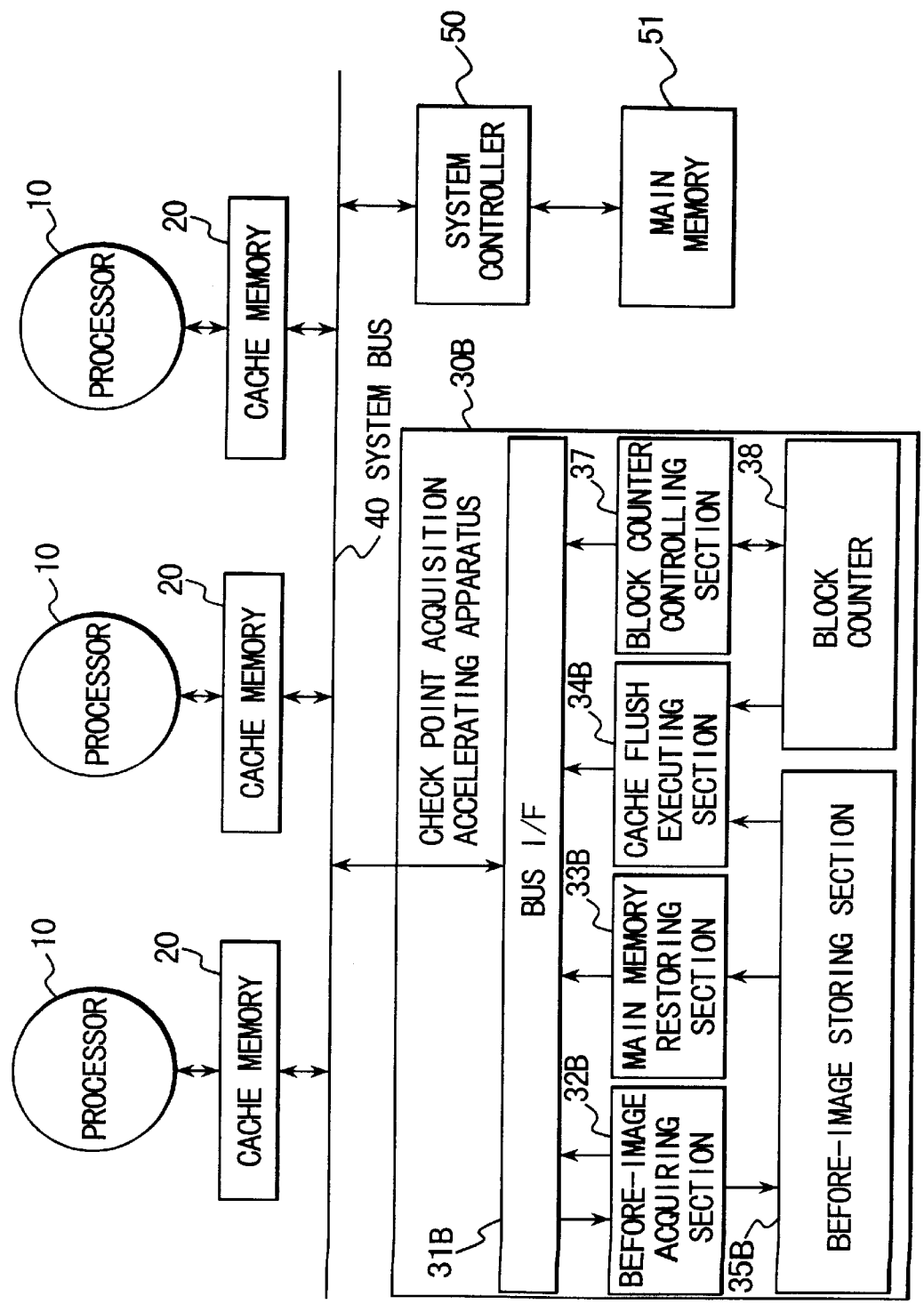
FIG. 17 is a diagram showing a system configuration of a computer system according to a third embodiment of the present invention.

Now, a third embodiment of the present invention will be explained. FIG. 17 shows a system configuration of a computer system according to the present embodiment. The configuration of the computer using the checkpoint acquisition accelerating apparatus 30B is the same as that in the first embodiment. The checkpoint acquisition accelerating apparatus 30B according to this embodiment has a block counter 38 and a block counter controlling section 37 in addition to the component parts of the configuration of the first embodiment.

The block counter 38 is a group of counters associated with one or more address ranges and is used for storing the number of cache blocks in "Modified" state included in each address range. The address ranges, however, are set not to have any common portion. An example of setting the address ranges will be explained with reference to the cache memory 20 of direct map type.

A group of addresses corresponding to one cache block is assumed to be an address range. In this case, each counter associated with a block counter stores the number of the corresponding blocks in "Modified" state. If the number of processors is P, for example, the counter is capable of assuming values from 0 to P+α, where α is a positive integer. This corresponds to the fact that data at a plurality of addresses appear, though temporarily, to be stored in "Modified" state for a given cache block as viewed from the checkpoint acquisition accelerating apparatus for monitoring the system bus due to the effect of a write buffer included in a high-speed processor recently introduced. The value of α is sufficient at about P. The count on each counter configuring the block counter is incremented or decremented by the block counter controlling section 37. Also, the counter is referenced by the cache flush executing section 34A.

The block counter controlling section 37 monitors the bus command on the system bus 40 and the response thereto, and when it detects that a cache block changes to the "Modified" state, the counter corresponding to the given address, if any, is incremented by one. If the block counter controlling section 37 detects that a cache block changes from the "Modified" state to other state, on the other hand, the counter corresponding to the given address, if any, is decremented by one.

The operation performed by the block counter controlling section 37 when it detects the bus command on the system bus 40 and the response thereto is described below.

(1) "Read-Line" bus command

In the event that the modified response signal line is asserted, the counter corresponding to the address included in the bus command is decremented by one. Otherwise nothing is done.

(2) "Read-Line-with-Invalidate" bus command

If the modified response signal line is asserted, nothing is done. Otherwise, the counter corresponding to the update address included in the bus command is incremented by one.

(3) "Invalidate" bus command

The counter corresponding to the update address included in the bus command is incremented by one.

(4) "Write-Line" bus command

The counter corresponding to the address included in the bus command is decremented by one.

If the modified response signal line is asserted by a "Read-Line" bus command, the data of the cache block in "Modified" state is written-back to the main memory, indicating that the "Modified" state is changed to the "Clean-Shared" state. The counter thus is decrement by one. Also, if the modified response signal line is asserted in response to a "Read-Line-with-Invalidate" bus command, it indicates that the cache block in "Modified" state is transferred from one cache memory to another. The counter value therefore remains unchanged.

The before-image acquiring section 32B is identical to the before-image acquiring section 32 according to the first embodiment.

Figure 18:
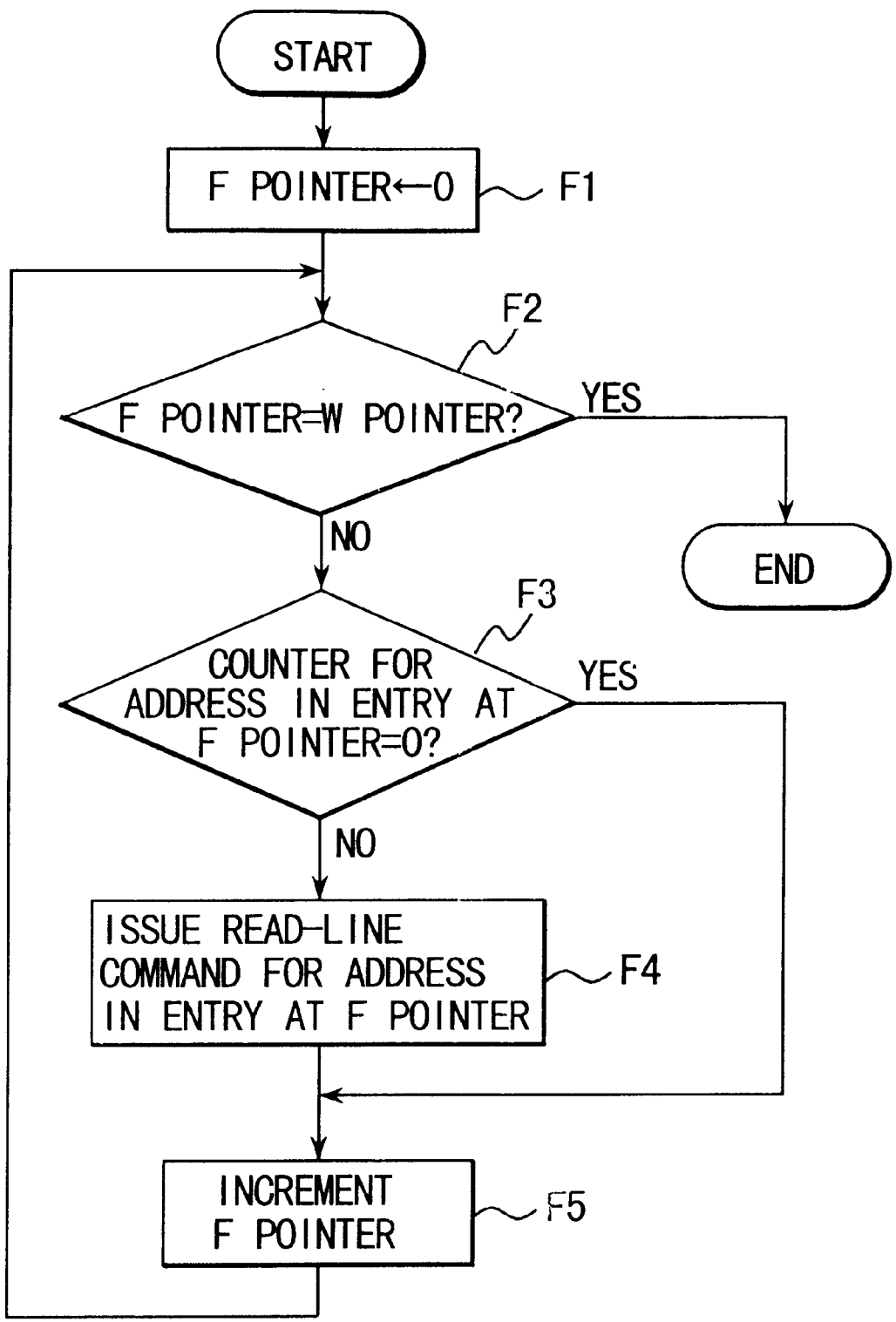
FIG. 18 is an operation diagram of a cache flush executing section according to the third embodiment.

The operation of the cache flush executing section 34B will be explained with reference to FIG. 18. The cache flush executing section 34B causes the F pointer to indicate the first entry in response to a request from the processor 10 as shown at step F1, after which it is determined at step F2 whether or not the F pointer coincides with the W pointer. If the F pointer is equal to the W pointer, the cache flush process is terminated. In the process, all the cache blocks are in "Invalid" or "Clean-Shared" state.

If the F pointer and the W pointer are not equal to each other, on the other hand, it is determined at step F3 whether or not the counter is 0 for the address in the entry indicated by the F pointer. If the answer is YES, the F pointer is incremented by one at step F5, while if the answer is NO, a "Read-Line" bus command is issued at step F4 using the update address in the entry indicated by the F pointer. At step F5, the F pointer advances. A "Read-Line" bus command is issued in order to take advantage of the property of a "Read-Line" bus command and the response thereto that if there is any cache block that stores the data of the given address in "Modified" state, the given data is transferred also to the main memory 51 so that the given cache block changes from "Modified" state to "Clean-Shared" state. After incrementing the F pointer by one, the process is returned to step F2.

In this way, the cache flush executing section 34B according to the present embodiment is equivalent to the cache flush executing section 34 according to the first embodiment further comprising a mechanism which refers the value on the corresponding counter and if the value on the counter is zero, prevents a "Read-Line" bus command from being issued.

The main memory restoring section 33A is identical to the main memory restoring section 33 according to the first embodiment.

Now, the operation of the checkpoint acquisition accelerating apparatus 30B will be explained.

(Initialization)

The processor 10 sets the value of all the counters making up the block counter 38 to zero. In synchronism with this operation, the processor 10 sets all the cache blocks to other than the "Modified" state by executing the appropriate software.

(Normal data processing)

The processor 10 activates the before-image acquiring section 32B beginning of the normal data processing. With reference to FIG. 19, explanation will be made about the normal data processing in which the processor 10 updates the data of address a from A0 to A1, the data of address b from B0 to B1 and the data of address a from A1 to A2, in this order. Addresses a and b are assumed to both correspond to the cache block BLK0, which holds the data A0 of address a in "Clean-Shared" state initially. Also, assume that there is one counter provided corresponding to the cache block BLK0.

1: Indicates the initial state

2: The processor 10 tries to update the data of address a to A1. Since the cache block BLK0 holds the data of address a in "Clean-Shared" state, an "Invalidate" bus command is issued for address a.

3: The other cache memories 20 having the data invalidate the cache block of address a, if any, and returns a response indicating the completion. The data on the cache memory 20 is updated from A0 to A1. The block counter controlling section 37 increments the given counter by one to 1.

4: The before-image acquiring section 32B issues a "Read-Line-Non-Coherent" bus command for address a.

5: The main memory 51 responds with data A0. The before-image acquiring section 32B stores the pair of address a and the data A0 in the before-image storing section 35B.

6: The processor 10 tries to update the data of address b to B1. Since the cache block BLK0 stores the data A1 of address a in "Modified" state, a "Write-Line" bus command for writing back the data A1 of address a is stored temporarily in a write buffer, and a "Read-Line-with-Invalidate" bus command is issued to address b first.

7: The main memory 51 returns a response with the data B0. The block counter controlling section 37 increments the counter by one to 2. The before-image acquiring section 32B stores the set of the address b and the data B0 in the before-image storing section 35B.

8: A "Write-Line" bus command for the address a suspended within the write buffer is issued.

9: The data at address a of the main memory 51 changes to A1. The block counter controlling section 37 decrements the counter by one to 1.

10: The processor 10 tries to update the data of address a to A2. Since the cache block BLK0 stores the data B1 of address b in "Modified" state, a "Write-Line" bus command for writing back the data of address b is temporarily stored in the write buffer, and a "Read-Line-with-Invalidate" bus command for address a is issued first.

11: The main memory 51 returns a response with the data A1. The block counter controlling section 37 increments the counter by one to 2. The before-image acquiring section 32B stores the pair of address a and the data A1 in the before-image storing section 35B.

12: A "Write-Line" bus command for address b suspended within the write buffer is issued.

13: The data at address b of the main memory 51 is changed to B1. At the same time, the block counter controlling section 37 decrements the counter by one to 1.

An example of operation of the processor 10, the main memory 51, the block counter controlling section 37, and the before-image acquiring section 32B for normal data processing was explained above.

(Checkpoint acquisition)

Under the above-mentioned condition, suppose that the processor 10 activates the cache flush executing section 34B. The cache flush executing section 34B issues a "Read-Line" bus command for address a, address b and address a, in this order. The manner in which the bus command is so issued is shown in FIG. 20. The underlines attached in the before-image column each represent the position indicated by the F pointer.

1: Indicates the initial state.

2: The cache flush executing section 34B uses the before image of the address a indicated by the F pointer. Since the counter corresponding to address a is 1, the cache flush executing section 34B issues a "Read-Line" bus command for address a.

3: BLK0 stores the data A2 of address a in "Modified" state, and therefore the modified response signal line is asserted. The write-back to the main memory 51 thus is performed and the data at the address a of the main memory 51 changes to A2. BLK0 is changed to "Clean-Shared" state. Since the modified response signal line is asserted in response to a "Read-Line" bus command, the block counter controlling section 37 decrements the counter by one to 0.

4: The cache flush executing section 34B tries to use the set of the before-image address b and the data B0. Since the value on the counter corresponding to address b is 0, a "Read-Line" bus command is not issued.

5: The cache flush executing section 34B tries to use the address a and the data A1. Since the value on the counter corresponding to address a is 0, a "Read-Line" bus command is not issued.

Upon completion of operation of the cache flush executing section 34B, the contents of all the cache blocks that have thus far been in "Modified" state are written-back to the main memory 51. At the same time, these cache blocks are changed to the "Clean-Shared" state. Also, the value on all the counters is set to zero. This is the same state as immediately after initialization. Upon completion of operation of the cache flush executing section 34B, therefore, the processor 10 can immediately start the normal data processing.

An example operation of checkpoint acquisition of the cache flush executing section 34B during a checkpoint acquisition explained above.

As described above, according to this embodiment, the provision of the block counter 38 can reduce the number of a "Read-Line" bus commands issued by the cache flush executing section 34B, and therefore the time required for the checkpoint acquisition can be reduced accordingly.

(Restoration of the main memory)

Now, with reference to FIG. 21, explanation will be made about the case where a fault occurs before starting the checkpoint acquisition as described above. If some fault occurs, the processor 10 invalidates all the cache blocks. The cache block BLK0 is therefore in invalid state.

1: Indicates the initial state.

2: The processor 10 executes the bus command for invalidating all the cache blocks.

3: As a result of execution of this bus command, BLK0 changes to an invalid state.

4: The main memory restoring section 33B issues the "Write-Line" bus command on the basis of the data A1 and the last-acquired before-image address a.

5: A1 is written in the address a of the main memory 51. The data in the address a which has originally been A1 remains unchanged.

6: The main memory restoring section 33B issues the "Write-Line" bus command on the basis of the data B0 and the before-image address b previously acquired.

7: The data at address b of the main memory 51 changes to B0.

8: The main memory restoring section 33B issues the "Write-Line" bus command on the basis of the data AD and the before-image address b previously obtained.

9: The data at address a of the main memory 51 changes to A0.

10. The processor sets the value of all the counters to zero.

11. As a result, the main memory 51 returns to the same state as at the time of completion of the checkpoint acquisition.

An example operation of the main memory restoring section 33B at the time of fault restoration was explained above.

The block counter 38 is not necessarily provided for all the addresses. In the absence of a corresponding counter for a given address, the cache flush executing section 34B constantly issues the "Read-Line" bus command to the given address.

As described above, in the checkpoint acquisition accelerating apparatus 30B according to this embodiment, the provision of the block counter 38 makes it possible to eliminate to some degree the overhead of the cache flush executing section 3B issuing the "Read-Line" bus command to an address lacking the cache block in "Modified" state. Also, upon completion of execution of the cache flush executing section 34B, the value of all the block counters is reset to zero by the block counter controlling section 37 appropriately incrementing by one or decrementing the value of the block counter 38 during the operation of the cache flush executing section 34B. Upon completion of operation of the cache flush execution section 34B, therefore, the processor 10 can immediately start the normal data processing.

The above-mentioned embodiment refers to the method in which the block counter 38 corresponds to each cache block of the cache memory 20 of direct mapping type.

Now, explanation will be made about the n-way set-associative type of the cache memory 20.

In the case of a cache memory of n-way set-associative type, the data at a given address is stored in one of n cache blocks forming a given one way. Which cache block to store the data, however, can vary from one case by case.

In view of this, assume that one counter is provided for n cache blocks forming one way. Specifically, a given counter stores the number of cache blocks in "Modified" state of a corresponding way. If the number of processors is P, the counter can assume the value from 0 to P×n+α, where α is a margin to accommodate the function of the write buffer of the processor as described above with reference to the direct mapping scheme.

Also, instead of providing the block counter 38 corresponding to a cache lock or a group of cache blocks constituting one way, the main memory can be divided into pieces of the same size as the cache blocks, each of the pieces having a counter. In this case, regardless of the number of the processors included in the computer, the number of the cache blocks in "Modified" state for each address is 0 or 1, and therefore each address can be expressed by one bit. The block counter controlling section 37 can thus be simplified.

The present embodiment is similar to the second embodiment in that the main memory is divided into the pieces of the same size of the cache blocks, and each address thereof is adapted to have one-bit information. The present embodiment, however, is different from the second embodiment in the following point:

Specifically, the on-off timing of the 1-bit information and the object controlled by the on-off operation are different. More specifically, although the second embodiment uses the on-off operation for making the decision on whether or not the before-image is acquired, the present embodiment uses the on-off operation to decide whether or not the cache flush executing section 34B issues the "Read-Line" bus command.

Also, if a fault occurs in the computer of checkpoint type, all the areas of the main memory are not returned to the state of the most recent checkpoint, but there is a part of the areas of the main memory prohibited from being returned to the most recent checkpoint, including the area storing the history of faults and restoration thereof or the area where the program for carrying out the restoration process is handled.

The checkpoint acquisition accelerating apparatus 30B that can realize such a scheme is either of the following-described two types:

(1) The before-image acquiring section 32B includes a mechanism (different from the flag in the second embodiment) for determining whether or not the before-image is to be acquired. This method, in spite of the advantage that a lesser number of before-images are acquired, is subjected to the risk of failing to follow the operation of the processor 10 or the system bus 40 unless the decision is made with rapidity. (2) The main memory restoring section 33B includes a similar decision mechanism to decide whether or not to issue the "Write-Line" bus command for writing the before-image in the main memory 51. This method can be implemented substantially with any execution speed. Provision of a similar decision mechanism in the cache flush executing section 34B, on the other hand, can somewhat shorten the time required for the checkpoint acquisition.

In this method, the areas prohibiting the restoration are the physically continuous ones used for storing the control software. If it is assumed that the head address of an area can be freely set, this method is equally applicable to the above method (1) and requires a high execution speed or a great amount of hardware.

As shown in FIG. 22, this method includes a mechanism comprising an address register 61 for storing an update address to be decided on, a mask register 62 with a 33-bit AND circuit 63 for masking a part of bits of an address register, and a reference register 64 with a 32-bit comparator 65 for comparing the resulting outputs. If the comparator 65 decides on a coincidence, the before-image is not sampled out. If the decision in this mechanism is too late, the result obtained by this mechanism may be used immediately before storing the before-image, for example, by first issuing the "Read-Line-Non-Coherent" bus command associated with the "Invalidate" bus command.

A method has been described above in which the before-image acquiring section 32B acquires the update address and the previous data upon the updating of the data in the cache memory 20 and upon the observation of the "Invalidate" bus command or the "Read-Line-with-Invalidate" bus command issued to the system bus 40. In some computers, however, data may be transferred to the main memory 51 from the I/O devices or may be written in the main memory 51 from the processor 10 without the intermediary of the cache memory 20. Modifications of the before-image acquiring section 32B and the main memory restoring section 33B applicable to such a computer will be explained below.

(Modification 1)

The following prerequisites are required to met:

(1) A bus command (which is herein called the "Write-Non-Coherent" bus command) other than the "Write-Line" bus command is used for writing to the main memory 51.

(2) A control signal line called the retry response line is included in the specification of the system bus 40. If the "Write-Non-Coherent" bus command is issued to the system bus, the retry signal line is asserted thereby to request the suspension of the execution of the given bus command. The bus command thus suspended is issued again after the lapse of a short time.

The before-image acquiring section 32B, upon detection of the "Write-Non-Coherent" bus command, asserts the retry response line. Immediately after that, the "Read-Line-Non-Coherent" bus command is issued using the update address included in the "Write-Non-Coherent" bus command. The set of the update address and the data included in the response from the main memory 51 is stored as a before-image in the before-image storing section 35B. On the other hand, the retry response line is not asserted by the before-image acquiring section 32B upon detection of the "Write-Non-Coherent" bus command including the same address as in the previous case.

(Modification 2)

The data transfer to the main memory 51 from I/O devices or the write operation to the main memory 51 not through the cache memory 20 from the processor 10 is accomplished under the control of the processor 10. Consequently, the before-image can be acquired by the before-image acquiring section 32B as a result of the processor 10 updating the data at the given address through the cache memory 20 before issuing the "Write-Non-Coherent" bus command. In that case, the processor 10 invalidates the cache block that has thus far stored the update data, and activates the data transfer from the I/O devices to the main memory 51.

(Modification 3)

The before-image acquiring section 32B further includes the function of acquiring and storing the before-image for the address range designated by the processor 10. Normally, the data transfer to the main memory 51 from the I/O devices is carried out in continuous addresses, and therefore a plurality of before-images can be acquired by a single instruction from the processor 10. This modification, therefore, is higher in processing speed than the second modification.

The first to third embodiments described above relate to hardware modifications. Now, explanation will be made about embodiments relating to a modification of the processing operation applicable to any of the first to third embodiments.

(Fourth embodiment)

In the first to third embodiments, the before-image is acquired by operating the before-image acquiring sections 32, 32A, 32B at the time of normal data processing. At the time of checkpoint acquisition, on the other hand, the processor 10 activates the cache flush executing section 34, 34A, 34B, and after waiting for the termination of the process thereof, the normal data processing is resumed. According to a fourth embodiment, there are provided an optimized method of controlling the checkpoint acquisition accelerating apparatus 30, 30A, 30B with a shorter time required for the checkpoint acquisition and such an apparatus having a function and a configuration applicable to such a control method. This control method will be called an early flush method.

In a computer of checkpoint and recovery type applicable to the checkpoint acquisition accelerating apparatuses 30, 30A, 30B according to the present invention, the time required for continuing the normal data processing is typically several milliseconds to several tens of milliseconds. At the time of completion of the checkpoint acquisition, all the cache blocks are in "Invalid" state or "Clear-Shared" state but none of them is in "Modified" state. Upon resumption of the normal data processing, the cache blocks in "Modified" state gradually increase in number to such an extent that 10% to 50% of the cache blocks are typically changed to "Modified" state by the time when the next checkpoint acquisition begins.

A major proportion of the time required for checkpoint acquisition represents the process of issuing the "Read-Line" bus command to the addresses of the before-image stored in the before-image storing section 35. Methods for improving the speed of this operation include the use of the flag memory 36 according to the second embodiment and the use of the block counter 38 according to the third embodiment. These embodiments are intended to reduce the issue of the redundant "Read-Line" bus commands.

According to the fourth embodiment, a method will be explained in which the cache flush executing section 34 is activated before the checkpoint acquisition, i.e., during the normal data processing. Also, explanation will be about the fact that the checkpoint acquisition accelerating apparatuses 30, 30A, 30B described in the first to third embodiments are correctly operated by this control method and also about a configuration of the checkpoint acquisition accelerating apparatus more suitable for this control method.

First, explanation will be made about the temporal relation between the operations of the processor 10, the before-image acquiring section 32 (or 32A, 32B) and the cache flush executing section 34 (or 34A, 34B) with reference to FIG. 23.

The processor 10 causes the before-image acquiring section 32 to perform its operation during the normal data processing and during the first half of the checkpoint acquisition (before-image process). Also, the processor 10 activates the cache flush executing section 34 during the normal data processing. After that, the processor 10 updates the data with the normal data processing. Concurrently with this process, the updated data are stored by the before-image acquiring section 32 in the entry of the before-image storing section 35 indicated by the W pointer (described with reference to the first embodiment), and the cache flush executing section 34 issues the "Read-Line" bus command to the address stored in the entry of the before-image storing section 34 indicated by the F pointer, so that the contents of the cache blocks in "Modified" state are written-back to the main memory 51.

With the starting of the checkpoint acquisition by the processor 10, the context as of the time of suspension of the normal data processing is written in the main memory 51 (in the cache memory 20, actually), after which the processor waits for termination of the process by the cache flush executing section 34.

Now, the operation diagram of the processor of early flush type will be explained with reference to FIG. 24.

In the normal data processing, the before-image acquiring section 32 is activated at step G1, and an application program and an operating system (normal data processing) are executed at step G2. Then, it is determined at step G3 whether or not the timing has arrived for activating the cache flush executing section 34. The timing of activating the cache flush executing section 34 will be described later. Upon detection of a timing of activation, the cache flush executing section 34 is activated at step G4. The application program and the operating system (normal data processing) are executed at step G5. Then, it is determined at step G6 whether or not the normal data processing has continued for a predetermined length of time. Upon decision that the normal data processing has continued for a predetermined length of time, the normal data processing is suspended and the checkpoint acquisition is started.

In the checkpoint acquisition, first, the processor 10 is set in an interrupt-inhibit state not to accept any interrupt from external devices at step G7. This is in order to prevent the execution of the normal data processing during the checkpoint acquisition. An interrupt for notifying a fault of the computer, however, must be given a higher order of priority than the normal interrupt and accepted even during the interrupt-inhibited state. The context, i.e., the contents of the register as of the time of suspension of the normal data processing is also written into the appropriate address of the main memory 51 at step G7. According to this embodiment using a cache memory of copy-back type, however, the cache blocks are still kept in "Modified" state as in the case of normal data updating, and the before-image of the same address is still stored in the before-image storing section 35.

After that, the processor 10 deactivates the before-image acquiring section 32 at step G8, followed by step G9 for waiting until the data in all the cache blocks in "Modified" state are written-back by the cache flush executing section 34 to the main memory 51 using the before-image in the before-image storing section 34. The context of the processor 10 is also written-back to the main memory 51 at the same time. Upon completion of execution of the cache flush executing section 34, the context stored in the main memory 51 is returned to the corresponding register and cancels the interrupt-inhibit state at step G10, thus resuming the normal data processing.

Figures 25A, 25B:
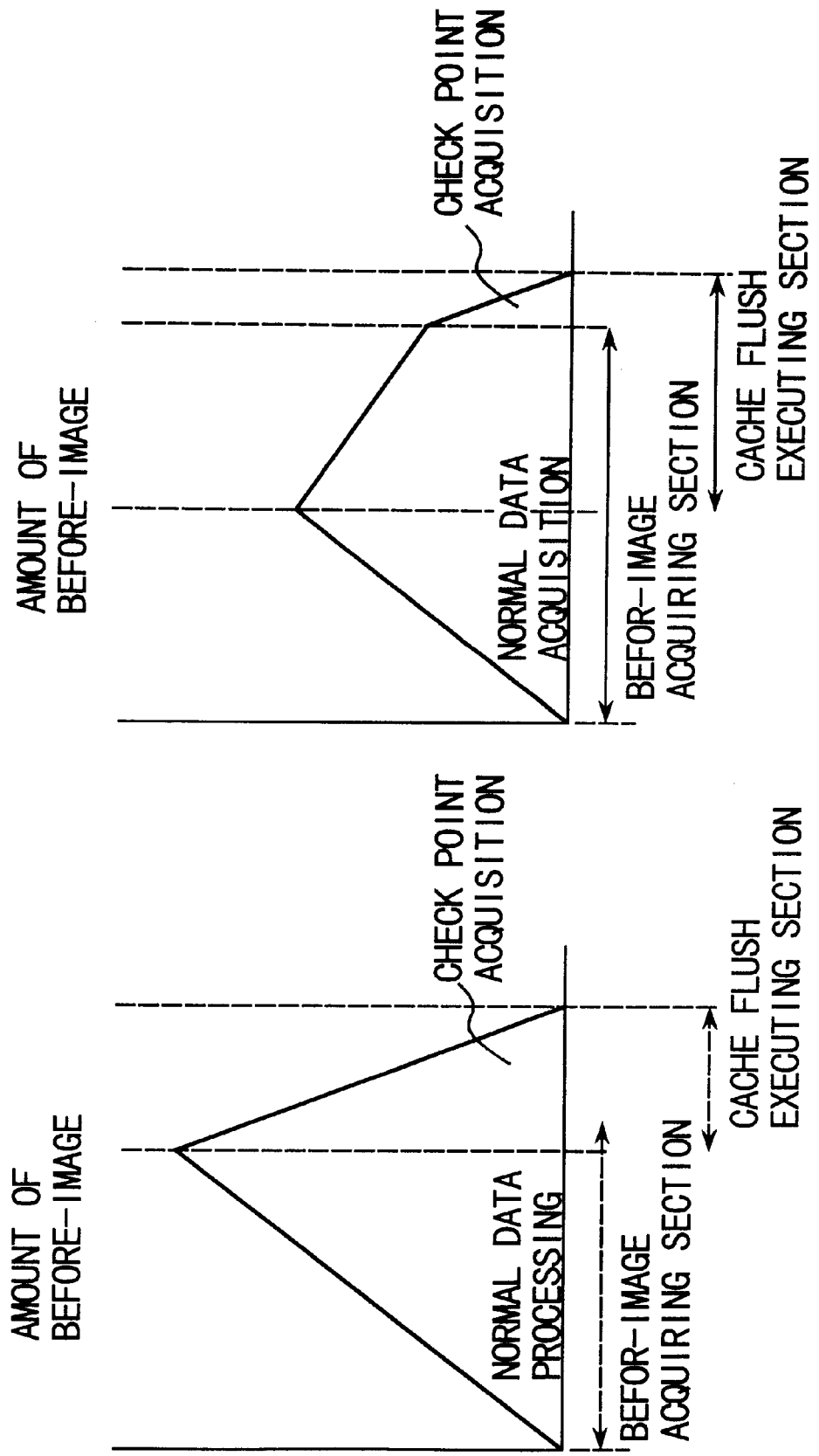
FIGS. 25A and 25B are model diagrams showing the effect of the early-flush scheme according to the fourth embodiment as compared with the effect of the original control scheme.

The effect of the early flush method as compared with the effect of the normal flush method in the first to third embodiments is shown in the model diagrams of FIGS. 25A, 25B. The ordinate of these diagrams represents the before-image amount to be processed by the cache flush executing section, and the abscissa the time.

In both the normal control method (FIG. 25A) and the early flush method (FIG. 25B), immediately after starting the normal data processing, the amount of the before-images newly acquired increases substantially linearly.

In the normal control method, this trend continues until immediately before the checkpoint acquisition. In the early flush method, on the other hand, the cache flush executing section 34 is activated during the normal data processing, so that the before-image acquiring section 32 acquires before-images anew while the cache flush executing section 34 issues the "Read-Line" bus command at the same time, with the result that the amount of the before-images (difference between W pointer and F pointer) to be processed by the cache flush executing section 34 increases at a lower rate or decreases. The diagrams (FIGS. 25A and 25B) represent the case in which the amount of before-images decreases. Whether or not the amount of before-image to be processed by the cache flush executing section 34 is to be reduced or not can be controlled by the configuration of the cache flush executing section 34 and will be described later.

The time required for the checkpoint acquisition using the checkpoint acquisition accelerating apparatus 30 according to this embodiment is substantially proportional to the amount of before-images to be processed by the cache flush executing section 34. The early flush method, therefore, can greatly reduce the time required for the checkpoint acquisition. The time during which the normal data processing continues is typically several milliseconds to several tens of milliseconds, as described above. The time required for the checkpoint acquisition in the normal control method is about one millisecond to 10 milliseconds. The rejection of an interrupt from external devices during this time can be one reason of limiting the applications of the computer of the checkpoint and recovery type according to the present invention. The fact that the time required for the checkpoint acquisition is reduced by a factor of fractions by the early flush method, therefore, has a sufficiently great significance.

The early flush method, however, has the disadvantage of deteriorating the performance in one aspect. Specifically, a cache block (typically, the counter arranged in the main memory) expected to be used in "Modified" state in the future is undesirably changed to "Clean-Shared" state, so that the next attempt of the processor to update the given data results in the invalid bus command being issued. A method of alleviating this performance deterioration will be described later.

Now, explanation will be made about the operation of the checkpoint acquisition accelerating apparatus 30.

According to the early flush method, the checkpoint acquisition accelerating apparatuses 30, 30A, 30B in the first to third embodiments operate in correct fashion. Since the operations are similar, only the operation of the second embodiment shown in FIG. 11 will be explained below.

(Initialization)

The processor 10 turns off all the flag memories 36. In synchronism with this, the processor 10 sets all the cache blocks in other than the "Modified" state by executing the appropriate software.

(Normal data processing and checkpoint acquisition)

The processor 10 activates the before-image acquiring section 32 at the time point of starting the normal data processing. Explanation will be made about the case where the following-described processes are performed in the shown order:

(1) The processor 10 has updated the data of address a from A0 to A1 and the data of address b from B0 to B1, in that order.

(2) The processor 10 has activated the cache flush executing section 34A.

(3) The cache flush executing section 34A has issued the "Read-Line" bus command to address a.

(4) The processor 10 has updated the data of address a from A1 to A2.

Both addresses a and b are assumed to correspond to the cache block BLK0, which in turn is assumed to maintain the data A0 of address a initially in "Clean-Shared" state.

This operation will be described in detail with reference to FIG. 26.

1: Indicates the initial state.

2: The processor 10 tries to update the data at address a to A1. Since the cache block BLK0 stores the data at address a in "Clean-Shared" state, however, the "Invalidate" bus command is issued to address a.

3: The other cache memories 20 storing the given data invalidate the cache blocks of address a, if any, and return a response indicating the termination.

4: The before-image acquiring section 32A turns on the flag memory 36 for address a, which has thus far been in off state, and issues the "Read-Line-Non-Coherent" bus command to address a.

5: The main memory 51 responds with the data A0. The before-image acquiring section 32A stores the set of address a and the data A0 in the before-image storing section 35A.

6: The processor 10 tries to update the data of address b to B1. Since the cache block BLK0 stores the data A1 of address a in "Modified" state, however, the "Write-Line" bus command for writing back the data of address a is temporarily stored in the write buffer, and the "Read-Line-with-Invalidate" bus command is issued first.

7: The main memory 51 responds with the data B0. The before-image acquiring section 32A turns on the flag memory 36 associated with address b that has thus far been off, and stores the set of address b and the data B0 in the before-image storing section 35A.

8: The "Write-Line" bus command for address a that has thus far been stored in the write buffer is issued.

9: The data of the address a of the main memory changes to A1.

10: The processor 10 activates the cache flush executing section 34A at this time point.

11: The cache flush executing section 34A turns off the flag memory 36 associated with address a using the set of the before-image address a and the data A0 while at the same time issuing the "Read-Line" bus command to address a.

12: BLK0 stores the data B1 of address b in "Modified" state. Therefore, neither the modified response signal line nor the shared response signal line is asserted. The main memory 51 responds with data A1. The state of BLK0 remains unchanged.

13: The cache flush executing section 34A turns off the flag memory 36 associated with address b using the set of the before-image of address b and the data B0, while at the same time issuing the "Read-Line" bus command to address b.

14: BLK0 stores the data B1 of address b in "Modified" state, and therefore the modified response signal line is asserted. The write-back to the main memory 51 thus is carried out, so that the data at address b of the main memory 51 changes to B1. BLK0 changes to "Clean-Shared" state.

15: The processor 10 tries to update the data of address a to A2. Since the cache block BLK0 stores the data B1 of address b in "Clean-Shared" state, however, the "Read-Line-with-Invalidate" bus command is issued to address a.

16: The main memory returns a response containing the data A1. The before-image acquiring section 32A turns on the flag memory 36 associated with address a that has thus far been off, and stores the set of address a and the data A1 in the before-image storing section 35A.

17: The cache flush executing section 3A turns off the flag memory 36 corresponding to the address a using the set of the before-image of address a and the data A1, and issues the "Read-Line" bus command to address a.

18: BLK0 stores the data A2 of address a in "Modified" state. Therefore, the modified response signal line is asserted, and the write-back to the main memory 51 is carried out. The data at address a of the main memory 51 changes to A2. BLK0 changes to "Clean-Shared" state.

Explanation was made above about an example operation of the normal data processing and the checkpoint acquisition performed by the processor 10, the main memory 51, the before-image acquiring section 32A and the cache flush executing section 34A according to the control method of the present embodiment.

(Restoration from a fault)

The operation of the main memory restoring section 33A is limited to issuing the "Write-Line" bus command for storing the before-images in the before-image storing section 35A on last-in first-out basis. Therefore, an operation example thereof will not be described.

From the foregoing description, it is seen that the checkpoint acquisition accelerating apparatus according to the second embodiment of the present invention correctly operates by the early flush method.

Now, explanation will be made about the function and the configuration of the checkpoint acquisition accelerating apparatus 30 (30A, 30B).

The first to third embodiments represent the case in which the cache flush executing section 34 (34A, 34B) processes the before-images stored in the before-image storing section 35 using the F pointer on first-in first-out basis. In the normal control method, the order of processing the before-images has no substantial effect. In the case of the early flush process method, however, the processing on first-in first-out basis has two advantages.

First, it is possible to alleviate the performance deterioration derived from the fact that a cache block expected to be used in "Modified" state in the future is undesirably changed to "Clean-Shared" state with the result that the "Invalidate" bus command is issued undesirably on the next occasion of trying to update the given data.

Specifically, the earlier a before-image is acquired, the more is it likely that a cache block in "Modified" state is absent at the time when the cache flush executing section 34 (34A, 34B) tries to start the processing. Even if the cache flush executing section 3 (34A, 34B) issues the "Read-Line" bus command, therefore, the possibility is smaller of changing to the "Clean-Shared" state.

The second advantage lies in the ease with which to control hardware. In the first place, the operation of the before-image acquiring section 32 (32A, 32B) writing entries on first-in first-out basis using the W pointer is followed by the cache flush executing section 34 (34A, 34B) using the F pointer. Therefore, the cache flush executing section 34 (34A, 34B) can make decision on termination in simple way.

Also, in the early flush method, competition of access to the before-image storing section 35 (35A, 35B) develops between the before-image acquiring section 32 (32A, 32B) and the cache flush executing section 34 (34A, 34B). Alternate read access and write access to a single memory bank will delay the read access and is desirably avoided. Especially, the avoidance of access competition is crucial in applications to a multiprocessor system having a plurality of processors.

On the assumption of using the W pointer and the F pointer described with reference to the first embodiment, an entry configuration and an operation of the before-image storing section 35 (35A, 35B) with a smaller competition will be described.

First, first-half n entries and last-half n entries are configured in two groups of memory bank A and memory bank B as shown in FIG. 27. This division into two memory banks is intended to make possible concurrent access to the two bank memories and, as described later, to avoid the case of alternate read and write accesses to a single memory bank.

In the first half of the normal data processing, i.e., as long as the before-image acquiring section 32 (32A, 32B) is in operation while the cache flush executing section 34 (34A, 34B) is not in operation, the before-image acquired is stored in the memory bank A. In the process, the memory bank A is subjected only to the write access.

Then, when the processor 10 activates the cache flush executing section 34 (34A, 34B), the before-image acquiring section 32 (32A, 32B) stores the acquired before-image in the memory bank B. The cache flush executing section 34 (34A, 34B) then retrieves the before-image from the memory bank A. At the same time, the memory bank A is subjected only to the read access, and the memory bank B only to the write access.

Next, the processor 10 starts the checkpoint acquisition immediately before the cache flush executing section 34 processes all the before-images in the memory bank A, and deactivates the before-image acquiring section 32 (32A, 32B) before long. In the process, the memory bank B is limited substantially to write access.

As described above, the interlocking of the operation of the memory bank, the activation of the cache flush executing section 34 (34A, 34B) and the starting of the checkpoint acquisition causes each memory bank to be accessed in read or write mode almost constantly. The operation of storing and retrieving the before-image thus can be performed at higher speed.

The forgoing description refers to the case in which the cache flush executing section 34 (34A, 34B) is activated by the processor 10. This control method has the advantage that the cache flush executing section 34 (34A, 34B) can be activated at the time when the before-image acquiring section 32 (32A, 32B) has stored the before-image in all the entries of the memory bank A. In such a case, the processor 10 is not required to activate the cache flush executing section 34 (34A, 34B) and the memory bank A can be used up to full capacity.

Also, the cache flush executing section 34 (34A, 34B) can control the frequency with which the "Read-Line" bus command is issued. In the normal control method, the cache flush executing section 34 (34A, 34B) operates with the processor 10 substantially inoperative. It has therefore been crucial how rapidly the "Read-Line" bus command is to be issued using the update address stored in the before-image storing section 35 (35A, 35B).

In the early flush method, however, an excessively high frequency of issue of the "Read-Line" bus command by the cache flush executing section 34 (34A, 34B) during the data process would substantially block the progress of normal data processing.

In view of this, it is desirable to provide two modes of decreasing and increasing the frequency of issue of the "Read-Line" bus command. An example of realizing this method will be explained with reference to the operation diagram of the cache flush executing section 34 (34A, 34B) shown in FIG. 28.

This operation diagram contains some correction from the counterpart according to the first embodiment shown in FIG. 5. Specifically, the cache flush executing section 34 (34A, 34B) causes the F pointer to designate the first entry as shown at step H1 in response to a request from the processor 10, and after that, determines whether or not the F pointer coincides with the W pointer at step H2. If the F pointer is equal to the W pointer, the cache flush process is terminated. At this time, all the cache blocks are in invalid or clear-shared state.

If the F pointer and the W pointer are not equal to each other, by contrast, the "Read-Line" bus command is issued at step H3 using the update address in the entry indicated by the F pointer, and the F pointer advances at step H4. The "Read-Line" bus command is issued in order to take advantage of the property of the "Read-Line" bus command and the response thereto in which the data of the given address which may be stored by any cache block in "Modified" state is transferred to the main memory 51 so that the given cache block is changed from "Modified" state to "Clean-Shared" state. After advancing the F pointer by +1, as shown at steps H5 and H6, C cycles are awaited if the before-image acquiring section 32 (32A, 32B) is in the process of execution. Otherwise, the process returns to step H2 for issuing the "Read-Line" bus command immediately using the next before-image.

A modification of this method is possible in which C cycles area awaited if the before-image acquiring section 32 (32A, 32B) has ever acquired the before-image within the latest several tens of cycles.

(Fifth embodiment)

Now, a fifth embodiment of the present invention will be explained. In the fourth embodiment described above, the processor 10 consumes a long time simply waiting (step G9 in FIG. 24) for the termination of the operation of the cache flush executing section 34 (34A, 34B) at the time of preparing a checkpoint. A method of improving this disadvantage will be explained, in which the processor executes a cache instruction issued for writing back the contents of the cache block in "Modified" state to the main memory 51 in software fashion. In the first to fourth embodiments, the cache flush is used also with hardware.

Figure 29:
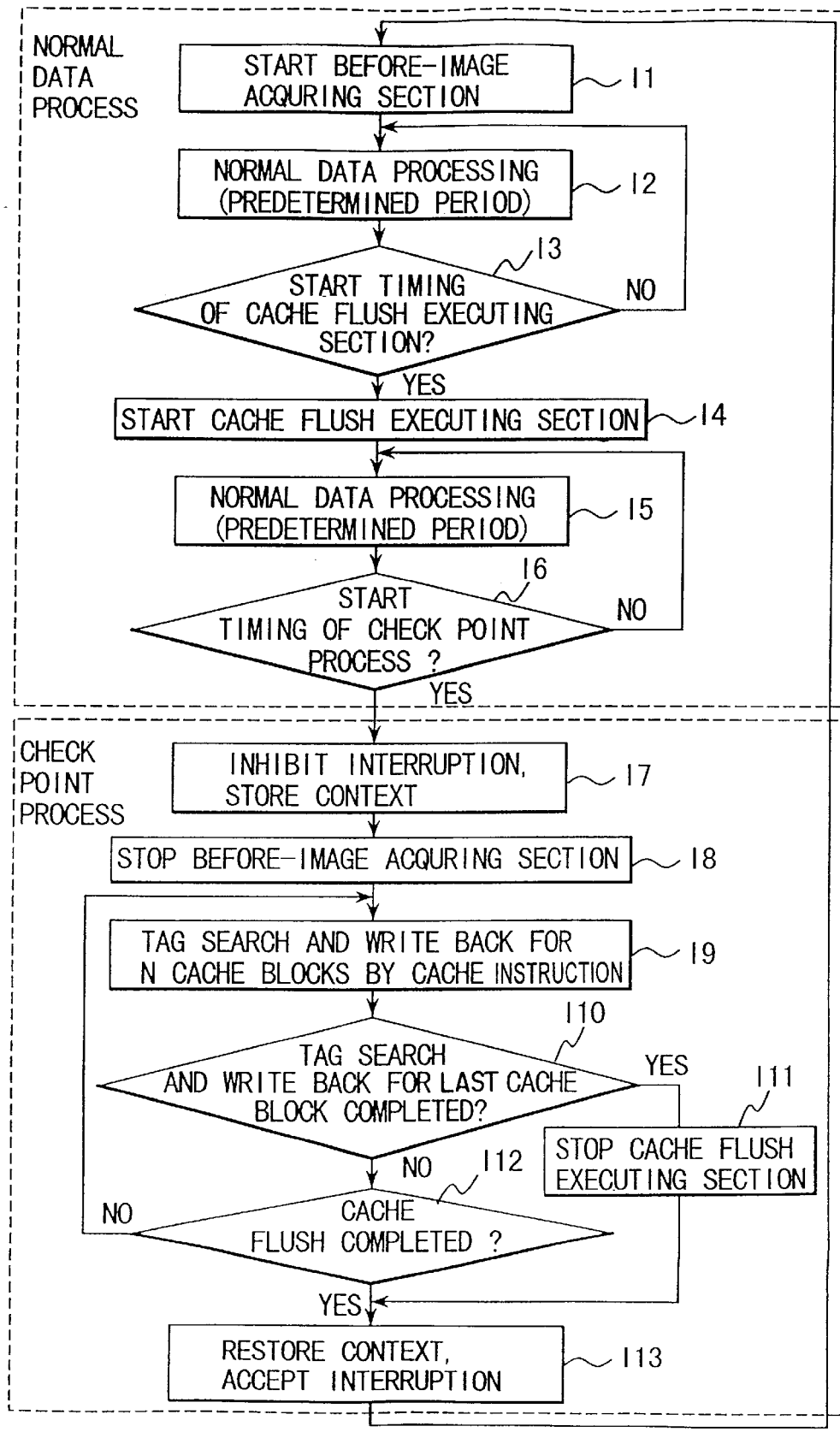
FIG. 29 is an operation diagram in the normal data processing and the checkpoint acquisition if the checkpoint/recovery method is realized by a processor using a checkpoint accelerating apparatus according to a fifth embodiment of the present invention.

FIG. 29 shows the operation diagram for the normal data processing and the checkpoint acquisition if the processor 10 realizes the checkpoint and rollback method using the checkpoint acquisition accelerating apparatus 30 (30A, 30B).

The normal data processing, which is exactly identical to that of the early flush method in the fourth embodiment, will not be described.

In the checkpoint acquisition, first, the processor 10 is set in interrupt-inhibit mode to reject any interrupt request from external devices at step I7. This is aimed at preventing the execution of the entire normal data processing during the checkpoint acquisition. An interrupt for notifying a computer fault, however, is given a high order of priority and is required to be accepted even during the interrupt inhibit mode. At step I7, the processor 10 writes to the appropriate address of the main memory 51 the context, i.e., the contents of the register as of the time of suspension of the normal data processing. According to this embodiment using the cache memory of copy-back type, however, the "Modified" state is maintained of the cache block and the before-image of the address thereof is stored in the before-image storing section 35 as in the case of normal data updating.

Then, at steps 19, I10, I12, the processor 10 executes the cache instruction for reading the tag of a cache block, and if the cache block is in "Modified" state, writes back the contents of the given cache block to the main memory 51. This process is repeated N times to perform the cache flush operation for N cache blocks.

If the cache flush based on the cache instruction has been completed by this time up to the last block (step I10), the cache flush executing section 34 (34A, 34B) is deactivated at step I11, after which the context stored in the main memory 51 is returned to the corresponding register and the interrupt-inhibit mode is canceled at step I13, thereby resuming the normal data processing.

If it is determined at step I10 that the cache flush to the last block according to the cache instruction is yet to be completed, on the other hand, the operation of the cache flush executing section 34 (34A, 34B) still continues. The processor 10, therefore, checks at step I12 whether or not the execution by the cache flush executing section 34 (34A 34B) has been completed. If the execution is found complete, the context stored in the main memory 51 is returned to the corresponding register, and the interrupt-inhibit mode is canceled at step I13, and thereby resumes the normal data processing.

The advantage of this method is that the time required for the checkpoint acquisition is shortened. Especially if the transfer capacity of the system bus 40 is so large that the system bus has more than sufficient transfer capacity to accommodate the operation of the cache flush executing section 34 (34A, 34B) alone, the cache flush in response to a cache instruction is used at the same time to shorten the time required for the checkpoint acquisition.

A modification of this method is conceivable in which the operation of the check flush executing section 34 (34A, 34B) is suspended midway as soon as the checkpoint acquisition is started, and only the cache flush operation is performed in accordance with the cache instruction. The cache flush process performed in software in response to a cache instruction, unlike the operation of the cache flush executing section 34 (34A, 34B), has the inherent advantage that a redundant bus command is not issued to the system bus 40. The present method, therefore, is effectively applicable if the number of processors is so large that when all the processors perform the cache process at a time in accordance with a cache instruction, the transfer capacity of the system bus 40 would be exhausted.

Further, the checkpoint acquisition accelerating apparatus can be improved in the manner described below, on the assumption that the checkpoint acquisition is executed simply by the cache flush in accordance with a cache instruction (in response to what is called a sole cache instruction method) by the early flush method.

In the checkpoint acquisition accelerating apparatus 30 (30A, 30B) described with reference to the fourth embodiment, the cache flush executing section 34 (34A, 34B) use the before-images on first-in first-out basis. In the sole cache instruction method, on the other hand, the cache flush executing section 34 (34A, 34B) of the checkpoint acquisition accelerating apparatus 30 (30A, 30B) can use any before-image. To avoid the adverse effect on the system performance, therefore, the contents of the cache blocks which repeatedly develop write operations are not desirably written-back to the main memory.

Means conceivable for realizing such a function operates in such a way that the cache flush executing section 34 (34A, 34B) uses the before-images not in the order of acquisition but any before-image acquired midway. The reason is that the address included in the before-image acquired early is considered liable to be used subsequently more frequently than those addresses included in the before-images acquired midway.

The present invention is not limited to the above-mentioned embodiments but can be modified in various ways. The fourth and fifth embodiments, for example, are applicable to any of the first to third embodiments. At the same time, a combination of the fourth and fifth embodiments can be applied to any of the first to third embodiments.

It will thus be understood from the foregoing description that according to the present invention, if the processor updates data in the cache memory, the before-image acquiring section acquires the update address and the previous data and stores them in the before-image storing section. The cache flush executing section, in response to a request from the processor, issues bus command requesting the contents of the updated cache blocks having the addresses stored in the before-image storing section to be written-back to the main memory using such addresses, thereby executing the cache flush. The main memory restoring section, on the other hand, in response to a request from the processor, issues bus command requesting all the previous data stored in the before-image storing section to be updated and written in the main memory on first-in last-out basis, thereby restoring the main memory to the state where nothing is stored in the before-image storing section.

Specifically, in an application of the checkpoint acquisition accelerating apparatus according to the present invention, an efficient checkpoint and recovery function can be realized for a computer system having a standard processor without any requirement of a cache memory. Also, as compared with the prior art in which the processor executes the cache flush software for executing the cache flush operation, the processing speed can be increased greatly thereby contributing to an improvement of the overall performance of the computer of checkpoint and recovery type.

A further improvement of the performance is possible by providing a flag memory corresponding to the cache block secured on the cache memory to avoid double storage of the before-image or by setting a plurality of address ranges having no common portion and providing a block counter corresponding to each of the address ranges thus set to avoid unnecessary cache flush operation.

We claim:

1. A checkpoint acquisition accelerating apparatus used for a computer including at least one processor having a cache memory of copy-back type with a bus snoop mechanism, a main memory and a system bus for connecting said processor and said main memory, said apparatus comprising:

before-image storing means for storing a plurality of before-images each including a pair of an update address of updated data and its previous data;

before-image acquiring means for monitoring said system bus and detecting a bus command indicating the occurrence of data update and a response to said bus command, storing said update address and said previous data in said before-image storing means if said bus command and response include the update address and the previous data, and for issuing another bus command for reading said previous data to said system bus using the address included in said bus command and storing said address and the previous data read out if said bus command and said response comprises said update address but not said previous data;

cache flush executing means for issuing bus commands requesting updated data within said cache memory to be written-back to the main memory using each address stored in said before-image storing means in response to a request from said processor; and main memory restoring means for issuing bus commands requesting all the previous data stored in said before-image storing means to be written into said main memory in anti-chronological order in response to a request from said processor.

2. A checkpoint acquisition accelerating apparatus according to claim 1, which further comprises:

a flag memory with two states of "on" and "off" and corresponding to a piece of said main memory whose size is as large as the cache block size, and in which said before-image acquiring means comprises means, when said before-image is acquired, for setting the associated flag memory "on" and storing said before-image in said before-image storing means when said flag memory is provided for the update address and said flag memory is "off", for preventing said before-image from being stored in said before-image storing means when said flag memory is provided for the update address and said flag memory is in on state, and storing said before-image in said before-image storing means when a flag memory is not provided for said update address, and said cache flush executing means comprises means, when issues a bus command requesting the before-image to be retrieved from said before-image storing means and the contents of the updated cache block to be written-back into said main memory, for turning off a flag memory if said flag memory is provided corresponding to said update address.

3. A checkpoint acquisition accelerating apparatus according to claim 1, which further comprises:

a flag memory assigned two states of "on" and "off" for each of at least one of a plurality of pieces into which said main memory is divided and each of which has the same size as the cache block secured in said cache memory; and flag memory control means for monitoring a bus command and a response thereto on said system bus, and upon detection of the transfer of said cache block to an updated state, turning on the flag memory, if any, corresponding to said address, and upon detection of the transfer of said cache block from the updated state to other state, turning off the flag memory, if any, corresponding to the address, and in which said cache flush executing means comprises means for detecting the presence or absence of a flag memory corresponding to each address stored in said before-image storing means, and issuing to said system bus a bus command requesting the updated contents of a cache block to be written-back to said main memory in the absence of said flag memory or in the presence of said flag memory in on state.

4. A checkpoint acquisition accelerating apparatus according to claim 1, which further comprises:

a block counter corresponding to at least one of a plurality of address ranges having no common portion for storing the number of updated cache blocks associated with each of said address ranges; and counter control means for monitoring a bus command and a response thereto on said system bus, and upon detection of the transfer of said cache block to an updated state, incrementing the block counter, if any, corresponding to said address by +1, and upon detection of the transfer of said cache block from the updated state to other state, decrementing the block counter, if any, corresponding to the address by −1, and in which said cache flush executing means comprises means, when the block counter corresponding to each address stored in said before-image storing means is not present or the block counter corresponding to each address stored in said before-image storing means and having a count value which is not an initial value is present, for issuing to said system bus a bus command requesting the updated contents of a cache block to be written-back to said main memory.

5. A checkpoint acquisition accelerating apparatus according to claim 4, in which said cache memory is of direct mapping type, and said block counter is arranged in one-to-one relation with said cache block.

6. A checkpoint acquisition accelerating apparatus according to claim 4, in which said cache memory is of n-way set-associative type and said block counter is arranged in one-to-one relation with a group of n cache blocks.

7. A checkpoint acquisition accelerating apparatus according to claim 1, 2 or 4, in which said before-image acquiring means and said cache flush executing means can be operated concurrently.

8. A checkpoint acquisition accelerating apparatus according to claim 7, in which the before-images stored in said before-image storing means are processed by said cache flush executing means on first-in first-out basis.

9. A checkpoint acquisition accelerating apparatus according to claim 7, in which said before-image storing means is configured of a plurality of memories independent of each other.

10. A checkpoint acquisition accelerating apparatus according to claim 7, in which said before-image storing means comprises first and second memories independent of each other, said before-image acquiring means comprises means for storing said acquired before-image in said first memory when said cache flush executing means is deactivated, and for storing said acquired before-image in said second memory when said cache flush executing means is activated, and said cache flush executing means comprises means for first processing said before-images stored in said first memory.

11. A checkpoint acquisition accelerating apparatus according to claim 10, in which said cache flush executing means is activated when said before-images are stored in the whole of said first memory by said before-image acquiring means.

12. A checkpoint acquisition accelerating apparatus according to claim 1, 2, 4, 5, 6 or 3, which further comprises address determining means for determining whether said before-image is to be stored in said before-image storing means according to said update address when said before-image acquiring means detects a bus command or a response to said bus command indicating the occurrence of data update in said cache memory.

13. A checkpoint acquisition accelerating apparatus according to claim 1, 2, 4, 5, 6 or 3, which further comprises address determining means for determining whether each of said before-images stored in said before-image storing means is to be written-back to said main memory by said main memory restoring means according to said update address.

14. A checkpoint acquisition accelerating apparatus according to claim 1, 2, 4, 5, 6 or 3, in which said before-image acquiring means does not store said before-image in said before-image storing means if the data to be updated in said cache memory is the one already updated and stored in other cache memory.

15. A checkpoint acquisition accelerating apparatus according to claim 1, 2, 4, 5, 6 or 3, further comprising response means which, if a plurality of states of management assigned to said cache block comprises "Clean-Exclusive" state in which data stored in said cache block is identical to data stored in said main memory and in which when the processor changes the data stored in said cache block the processor does not issue a bus command informing other processors of a change of the data stored in said cache block, responds as if said data is stored in a cache memory which does not exist actually to a bus command, said at least one processor requesting to read said data of the main memory, thereby preventing said cache block from becoming "Clean-Exclusive" state.

16. A checkpoint acquisition accelerating apparatus according to claim 1, 2, 4, 5, 6 or 3, in which said before-image acquiring means comprises:
  means for detecting and suspending the execution of a bus command for updating the contents of said main memory not through the mechanism of said cache memory, issuing to said system bus a bus command for reading the previous data from said main memory using the update address included in said bus command, and storing said address and said read previous data in said before-image storing means; and
  means for preventing the suspension of execution of said suspended bus command issued again.

17. A checkpoint acquisition accelerating apparatus according to claim 1, 2, 4, 5, 6 or 3, in which said before-image acquiring means comprises means for issuing a bus command to said system bus for reading the previous data from said main memory for the address range designated by said processor and storing the before-image including a set of said address and said read previous data in said before-image storing means.

18. A checkpoint acquisition accelerating apparatus according to claim 1, 2, 4, 5, 6 or 3, which further comprises means for informing said processor that the remaining capacity of said before-image storing means has been reduced below a predetermined amount.

19. A checkpoint acquisition accelerating apparatus according to claim 18, in which said cache flush executing means suppresses within a predetermined value a frequency of issue of the bus command requesting the contents of the updated cache block to be written-back to said main memory if said before-image acquiring means is in operation, and increasing the frequency of issue of said bus command if said before-image acquiring means is deactivated.

20. A computer system for processing data while acquiring at regular time intervals a checkpoint for restarting a suspended process, said computer system comprising at least one processor with a cache memory of copy-back type having a bus snoop mechanism, a main memory, and a system bus for connecting said processor and said main memory, characterized by comprising:
  a checkpoint acquisition accelerating apparatus used for a computer including at least a processor having a cache memory of copy-back type with a bus snoop mechanism, a main memory and a system bus for connecting said processor and said main memory, said apparatus comprising:
    before-image storing means for storing a plurality of before-images each including a set of an update address of updated data and a previous data;
    before-image acquiring means for monitoring said system bus and detecting a bus command indicating the occurrence of data update and a response to said bus command on said cache memory, storing said update address and said previous data in said before-image storing means if said bus command and response include the update address and the previous data, and for issuing a bus command for reading said previous data to said system bus using the address included in said bus command and storing said address and the previous data read out if said bus command and said response comprises said update address but not said previous data;
    cache flush executing means for issuing to said system bus a bus command requesting the updated data indicated by each address stored in said before-image storing means to be written-back to the main memory in response to an instruction from said processor; and
    main memory restoring means for issuing to said system bus a bus command requesting all the previous data stored in said before-image storing means to be updated and written into said main memory on last-in first-out basis in response to an instruction from said processor;
  data processing means for executing the normal data processing while activating said before-image acquiring means;
  checkpoint acquisition means for storing the context of the data process executed concurrently by said at least one processor into said main memory, and writing back into said main memory the contents of all the updated blocks of said cache memory executed by said cache flush executing means of said checkpoint acquisition accelerating apparatus; and
  rollback and recovery means for invalidating all the cache blocks upon occurrence of a fault, causing said main memory restoring means to restore said main memory to the state of the most recent checkpoint, and resuming the data process using the information stored in said main memory restored.

21. A computer system according to claim 20, which further comprises:
  a flag memory assigned two states of "on" and "off" and corresponding to at least one of a plurality of pieces into which said main memory is divided, each of said pieces having a size corresponding to at least one of cache blocks secured in said cache memory, and in which
  said before-image acquiring means comprises means, when said before-image is acquired, for setting a flag memory in off state and storing said before-image in said before-image storing means when said flag memory is provided for the update address and said flag memory is in off state, for preventing said before-image from being stored in said before-image storing means when said flag memory is provided for the update address and said flag memory is in on state, and storing said before-image in said before-image storing means when a flag memory is not provided for said update address, and
  said cache flush executing means comprises means, when issues a bus command requesting the before-image to be retrieved from said before-image storing means and the contents of the updated cache block to be written-back into said main memory, for turning off a flag memory if said flag memory is provided corresponding to said update address.

22. A computer system accelerating apparatus according to claim 20, which further comprises:
  a flag memory assigned two states of "on" and "off" for each of at least one of a plurality of pieces into which said main memory is divided and each of which has the same size as the cache block secured in said cache memory; and
  flag memory control means for monitoring a bus command and a response thereto on said system bus, and upon detection of the transfer of said cache block to an updated state, turning on the flag memory, if any, corresponding to said address, and upon detection of the transfer of said cache block from the updated state to other state, turning off the flag memory, if any, corresponding to the address, and
  in which said cache flush executing means comprises means for detecting the presence or absence of a flag memory corresponding to each address stored in said before-image storing means, and issuing to said system bus a bus command requesting the updated contents of a cache block to be written-back to said main memory in the absence of said flag memory or in the presence of said flag memory in on state.

23. A computer system accelerating apparatus according to claim 20, which further comprises:
  a block counter corresponding to at least one of a plurality of address ranges having no common portion for storing the number of updated cache blocks associated with each of said address ranges; and
  counter control means for monitoring a bus command and a response thereto on said system bus, and upon detection of the transfer of said cache block to an updated state, incrementing the block counter, if any, corresponding to said address by +1, and upon detection of the transfer of said cache block from the updated state to other state, decrementing the block counter, if any, corresponding to the address by −1, and
  in which said cache flush executing means comprises means, when the block counter corresponding to each address stored in said before-image storing means is not present or the block counter corresponding to each address stored in said before-image storing means and having a count value which is not an initial value is present, for issuing to said system bus a bus command requesting the updated contents of a cache block to be written-back to said main memory.

24. A computer system accelerating apparatus according to claim 23, in which said cache memory is of direct mapping type, and said block counter is arranged in one-to-one relation with said cache block.

25. A computer system accelerating apparatus according to claim 23, in which said cache memory is of n-way set-associative type and said block counter is arranged in one-to-one relation with a group of n cache blocks.

26. A computer system according to claim 20, in which said cache flush executing means is activated by the data process means before the operation of the checkpoint acquiring means.

27. A computer system according to claim 26, in which said checkpoint acquisition means uses both the cache flush operation of said cache flush executing means of said checkpoint acquisition accelerating apparatus and the cache flush operation based on the execution of a cache operating instruction.

28. A computer system according to claim 26, in which said checkpoint acquisition means deactivates said cache flush executing means of said checkpoint acquisition accelerating apparatus and executes the cache flush operation based on the execution of a cache operating instruction.

29. A computer system according to claim 28, in which said cache flush executing means of said checkpoint acquisition accelerating apparatus uses a before-image acquired midway first.

30. A computer system accelerating apparatus according to claim 20, 21 or 23, in which said before-image acquiring means and said cache flush executing means can be operated concurrently.

31. A computer system accelerating apparatus according to claim 30, in which the before-images stored in said before-image storing means are processed by said cache flush executing means on first-in first-out basis.

32. A computer system accelerating apparatus according to claim 30, in which said before-image storing means is configured of a plurality of memories independent of each other.

33. A computer system accelerating apparatus according to claim 30, in which
  said before-image storing means comprises first and second memories independent of each other,
  said before-image acquiring means comprises means for storing said acquired before-image in said first memory when said cache flush executing means is deactivated, and for storing said acquired before-image in said second memory when said cache flush executing means is activated, and
  said cache flush executing means comprises means for first processing said before-images stored in said first memory.

34. A computer system accelerating apparatus according to claim 33, in which said cache flush executing means is activated when said before-images are stored in the whole of said first memory by said before-image acquiring means.

35. A computer system accelerating apparatus according to claim 20, 21, 23, 24, 25 or 22, which further comprises address determining means for determining whether said before-image is to be stored in said before-image storing means according to said update address when said before-image acquiring means detects a bus command or a response to said bus command indicating the occurrence of data update in said cache memory.

36. A computer system accelerating apparatus according to claim 20, 21, 23, 24, 25 or 22, which further comprises address determining means for determining whether each of said before-images stored in said before-image storing means is to be written-back to said main memory by said main memory restoring means according to said update address.

37. A computer system accelerating apparatus according to claim 20, 21, 23, 24, 25 or 22, in which said before-image acquiring means does not store said before-image in said before-image storing means if the data to be updated in said cache memory is the one already updated and stored in other cache memory.

38. A computer system accelerating apparatus according to claim 20, 21, 23, 24, 25 or 22, further comprising response means which, if a plurality of states of management assigned to said cache block comprises "Clean-Exclusive" state in which the data stored in said cache block is not stored in the cache memories of the other processors and the same data as said data is stored in said main memory, responds that said data is stored in the main memory to a bus command issued by any one of said cache memories requesting to read said data of the main memory, thereby preventing said cache block from becoming "Clean-Exclusive" state.

39. A computer system accelerating apparatus according to claim 20, 21, 23, 24, 25 or 22, in which said before-image acquiring means comprises:

means for detecting and suspending the execution of a bus command for updating the contents of said main memory not through the mechanism of said cache memory, issuing to said system bus a bus command for reading the previous data from said main memory using the update address included in said bus command, and storing said address and said read previous data in said before-image storing means; and means for preventing the suspension of execution of said suspended bus command issued again.

40. A computer system accelerating apparatus according to claim 20, 21, 23, 24, 25 or 22, in which said before-image acquiring means comprises means for issuing a bus command to said system bus for reading the previous data from said main memory for the address range designated by said processor and storing the before-image including a set of said address and said read previous data in said before-image storing means.

41. A computer system accelerating apparatus according to claim 20, 21, 23, 24, 25 or 22, which further comprises means for informing said processor that the remaining capacity of said before-image storing means has been reduced below a predetermined amount.

42. A computer system accelerating apparatus according to claim 41, in which said cache flush executing means suppresses within a predetermined value a frequency of issue of the bus command requesting the contents of the updated cache block to be written-back to said main memory if said before-image acquiring means is in operation, and increasing the frequency of issue of said bus command if said before-image acquiring means is deactivated.

* * * * *